(12) United States Patent
Kim

(10) Patent No.: US 10,700,414 B2
(45) Date of Patent: Jun. 30, 2020

(54) ELECTRONIC DEVICE INCLUDING ANTENNA

(71) Applicant: Samsung Electronics Co., Ltd., Gyeonggi-do (KR)

(72) Inventor: Yong-Youn Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 569 days.

(21) Appl. No.: 15/430,110

(22) Filed: Feb. 10, 2017

(65) Prior Publication Data

US 2017/0288298 A1 Oct. 5, 2017

(30) Foreign Application Priority Data

Mar. 31, 2016 (KR) .......................... 10-2016-0039626

(51) Int. Cl.
| | | |
|---|---|---|
| *H01Q 1/24* | (2006.01) | |
| *H04M 1/02* | (2006.01) | |
| *G06F 1/26* | (2006.01) | |
| *G06F 1/16* | (2006.01) | |
| *H02J 50/00* | (2016.01) | |
| *H04B 1/3818* | (2015.01) | |

(Continued)

(52) U.S. Cl.
CPC ........... *H01Q 1/243* (2013.01); *G06F 1/1626* (2013.01); *G06F 1/1635* (2013.01); *G06F 1/1698* (2013.01); *G06F 1/263* (2013.01); *H01Q 7/00* (2013.01); *H02J 7/025* (2013.01); *H02J 50/005* (2020.01); *H02J 50/12* (2016.02); *H04B 1/3818* (2015.01); *H04M 1/0202* (2013.01); *H04M 1/026* (2013.01); *G06F 3/0412* (2013.01); *G06F 2203/04108* (2013.01); *H04M 1/0266* (2013.01); *H04M 2250/12* (2013.01); *H04M 2250/22* (2013.01)

(58) Field of Classification Search
CPC .............................. H01Q 1/243; H02J 50/005
See application file for complete search history.

(56) References Cited

U.S. PATENT DOCUMENTS

| 9,553,476 B2 * | 1/2017 | An | .......................... H01P 11/00 |
| 2015/0256211 A1 * | 9/2015 | Miyazaki | ............... H01Q 1/243 |
| | | | 455/575.8 |

(Continued)

FOREIGN PATENT DOCUMENTS

| KR | 20150025591 | 3/2015 | |
| WO | WO-2016190649 A1 * | 12/2016 | ............. H01F 38/14 |

*Primary Examiner* — Daniel J Cavallari
(74) *Attorney, Agent, or Firm* — The Farrell Law Firm, P.C.

(57) ABSTRACT

An electronic device is provided. The electronic device includes a housing including a first face and a second face, a conductive pattern extending in substantially the same direction as the first face, and an electronic circuit, wherein the conductive pattern includes a conductive line extending from a first end to a second end and includes a winding portion, wherein the winding portion includes a plurality of turns including an innermost turn defining an inner periphery of the winding portion and an outermost turn defining an outer periphery of the winding portion, wherein the electronic circuit is electrically connected to a first point positioned, and to a second point, and wherein the first point and the second point are disposed one of inside the inner periphery, outside the outer periphery, and between the inner periphery and the outer periphery.

19 Claims, 16 Drawing Sheets

(51) Int. Cl.
*H02J 50/12* (2016.01)
*H01Q 7/00* (2006.01)
*H02J 7/02* (2016.01)
G06F 3/041 (2006.01)

(56) References Cited

U.S. PATENT DOCUMENTS

2016/0064823 A1* 3/2016 Tsukuda .................. H02J 5/005
                                                    343/702
2016/0211702 A1* 7/2016 Muratov ................ H01F 38/14

* cited by examiner

US 10,700,414 B2

ELECTRONIC DEVICE INCLUDING ANTENNA

PRIORITY

This application claims priority under 35 U.S.C. § 119(a) to Korean Patent Application Serial No. 10-2016-0039626, which was filed in the Korean Intellectual Property Office on Mar. 31, 2016, the entire content of which is incorporated herein by reference.

BACKGROUND

1. Field of the Disclosure

The present disclosure relates generally to an electronic device, and more particularly, to an electronic device including an antenna.

2. Description of the Related Art

Conventional electronic devices may include one or more antennas that are suitable for respective services, such as mobile communication, a position tracking device, wireless internet, etc.

In terms of design, electronic devices are becoming thinner, and a space for mounting an antenna is becoming increasingly difficult to secure.

SUMMARY

An aspect of the present disclosure provides an antenna that is capable of being mounted in an electronic device having a wireless communication function and limited space.

An aspect of the present disclosure provides an antenna with a single layer structure that enables a thin-type design, and is capable of achieving an improvement in terms of fabrication process and cost.

In accordance with an aspect of the present disclosure, there is provided an electronic device. The electronic device includes a housing including a first face and a second face which face in opposite directions, a conductive pattern disposed in a plane that is disposed between the first face and the second face, the conductive pattern extending in substantially the same direction as the first face, and an electronic circuit electrically connected to the conductive pattern. The conductive pattern includes a conductive line extending from a first end to a second end and includes a winding portion between the first end and the second end. The winding portion includes a plurality of turns including an innermost turn defining an inner periphery of the winding portion and an outermost turn defining an outer periphery of the winding portion. The electronic circuit is electrically connected to a first point positioned to be one of on and near the first end of the conductive pattern, and to a second point positioned to be one of on and near the second end of the conductive pattern. The first point and the second point are disposed one of inside the inner periphery, outside the outer periphery, and between the inner periphery and the outer periphery.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
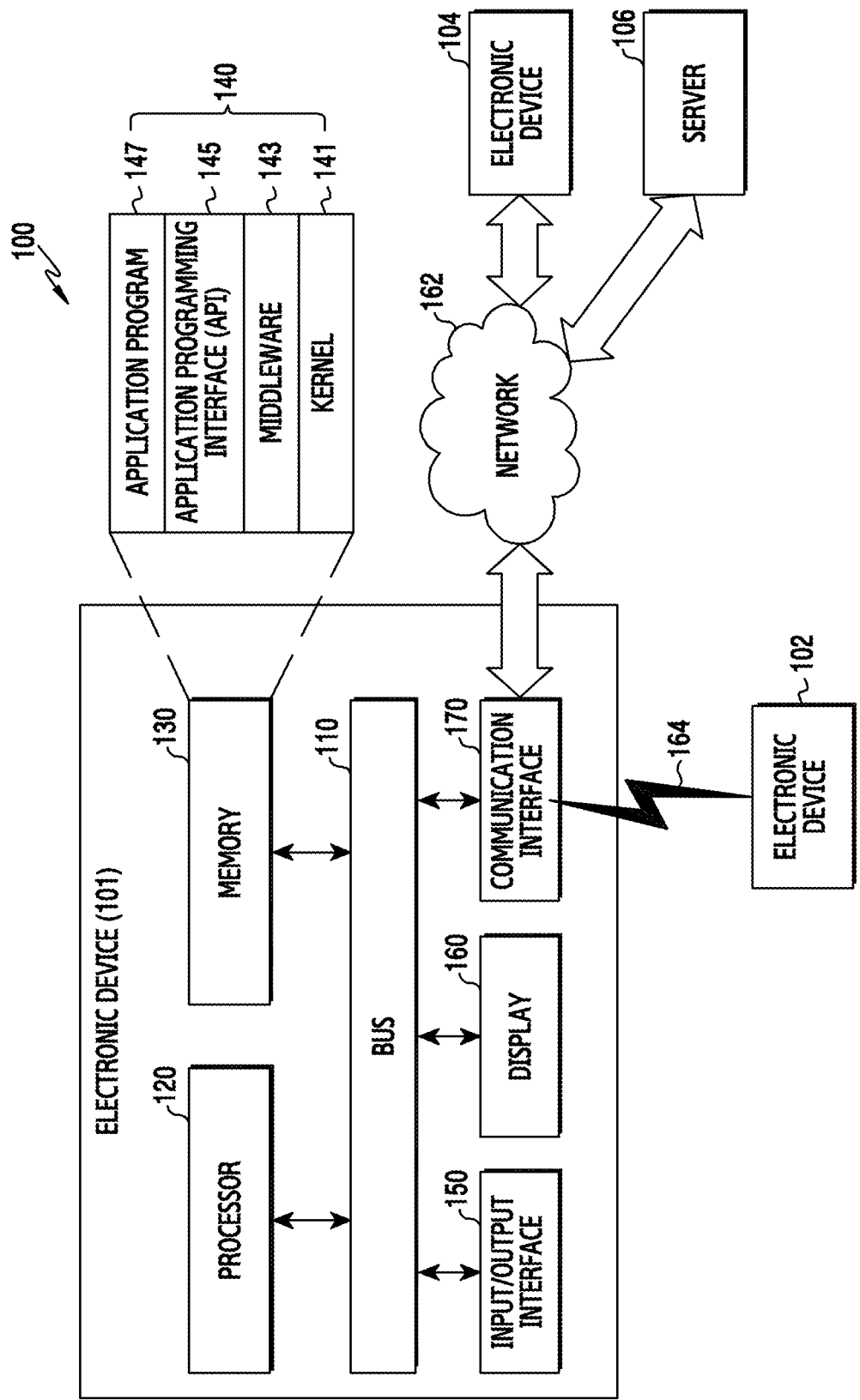
FIG. 1 is a diagram of a network environment that includes an electronic device, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to the embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

Referring to FIG. 1, an electronic device 101 within a network environment 100 is illustrated. The electronic device 101 includes a bus 110, a processor 120, a memory 130, an input/output interface 150, a display 160, and a communication interface 170. The electronic device 101 may omit at least one of the above-mentioned components or may additionally include other components.

The bus 110 may include a circuit that interconnects the above-mentioned components 110 to 170 and transmits communication (e.g., a control message or data) among the components.

The processor 120 may include a central processing unit (CPU), an application processor (AP), and a communication processor (CP). The processor 120 may execute an arithmetic operation or data processing that is related to a control and/or communication of one or more other components of the electronic device 101.

The memory 130 may include a volatile memory and/or a non-volatile memory. The memory 130 may store commands or data that are related to one or more other components of the electronic device 101. The memory 130 may store software and/or a program 140. The program 140 may include a kernel 141, a middleware 143, an application programming Interface (API) 145, and/or an application program (or an "application") 147. At least one of the kernel 141, the middleware 143, and the API 145 may be referred to as an operating system (OS).

The kernel 141 may control or manage system resources (e.g., the bus 110, the processor 120, or the memory 130) that are used for executing operations or functions implemented in the other programs (e.g., the middleware 143, the API 145, or the application program 147). In addition, the kernel 141 may provide an interface that allows the middleware 143, the API 145, or the application programs 147 to access individual components of the electronic device 101 so as to control or manage the system resources.

The middleware 143 may play an intermediary role such that the API 145 or the application programs 147 may communicate with the kernel 141 so as to exchange data.

In addition, the middleware 143 may process one or more task requests which are received from the application programs 147, according to priority. For example, the middleware 143 may assign the priority to be capable of using a system resource of the electronic device 101 (e.g., the bus 110, the processor 120, or the memory 130) to at least one of the application programs 147. The middleware 143 may perform scheduling, load balancing, or the like for the one or more task requests by processing the one or more requests according to the assigned priority.

The API 145 is an interface that allows the applications 147 to control functions provided from the kernel 141 or the middleware 143, and may include one or more interfaces or functions (e.g., commands) for a file control, a window control, an image processing, or a character control.

The input/output interface 150 may serve as an interface to transmit a commands or data, which is entered from, for example, a user or any other external device, to the other component(s) of the electronic device 101. Also, the input/output interface 150 may output commands or data, which are received from the other component(s) of the electronic device 101, to the user or the other external device.

The display 160 may include a liquid crystal display (LCD), a light emitting diode (LED) display, an organic light emitting diode (OLED) display, or a microelectromechanical system (MEMS) display, or an electronic paper display. The display 160 may display various contents (e.g., text, image, video, icon, or symbol) to the user. The display 160 may include a touch screen, and may receive a touch input, a gesture input, a proximity input, or a hovering input that is made using an electronic pen or a part of the user's body.

The communication interface 170 may set communication between the electronic device 101 and a first external electronic device 102, a second external device 104, or a server 106. The communication interface 170 may be connected with a network 162 through wired or wireless communication so as to communicate with the second external electronic device 104 or the server 106.

The wireless communication may use at least one of long-term evolution (LTE), LTE advance (LTE-A), code division multiple access (CDMA), wideband CDMA (WCDMA), universal mobile telecommunication system (UMTS), wireless broadband (WiBro), or global system for mobile communication (GSM), as a cellular communication protocol. In addition, the wireless communication may include the short range communication 164. The short range communication 164 may include at least one of wireless-fidelity (WiFi), bluetooth (BT), near field communication (NFC), and global navigation satellite system (GNSS). GNSS may include, for example, at least one of global positioning system (GPS), global navigation satellite System (Glonass), Beidou Navigation Satellite System (Beidou), Galileo, and the European global satellite-based navigation system, according to, for example, a use area or band width. Herein, "GPS" may be interchangeably used with "GNSS" below. The wired communication may use at least one of universal serial bus (USB), high definition multimedia interface (HDMI), recommended standard 232 (RS-232), and plain old telephone service (POTS). The network 162 may include a telecommunication network at least one of a computer network (e.g., local area network (LAN) or wide area network (WAN)), the internet, and a telephone network.

Each of the first and second external electronic devices 102 and 104 may be the same type as or different from the electronic device 101. The server 106 may include a group of one or more servers. All or some of the operations to be executed by the electronic device 101 may be executed by the electronic devices 102 and 104 or the server 106. When the electronic device 101 performs a certain function or service automatically or by a request, the electronic device 101 may request some functions or services that are associated therewith from the electronic devices 102 and 104 or the server 106, instead of or in addition to executing the functions or service by itself. The electronic devices 102 and 104 or the server 106 may execute the requested functions or additional functions, and may deliver the results to the electronic device 101. The electronic device 101 may provide the requested functions or services by processing the received results as they are or additionally. For this purpose, a cloud computing technique, a distributed computing technique, or a client-server computing technique may be used.

Figure 2:
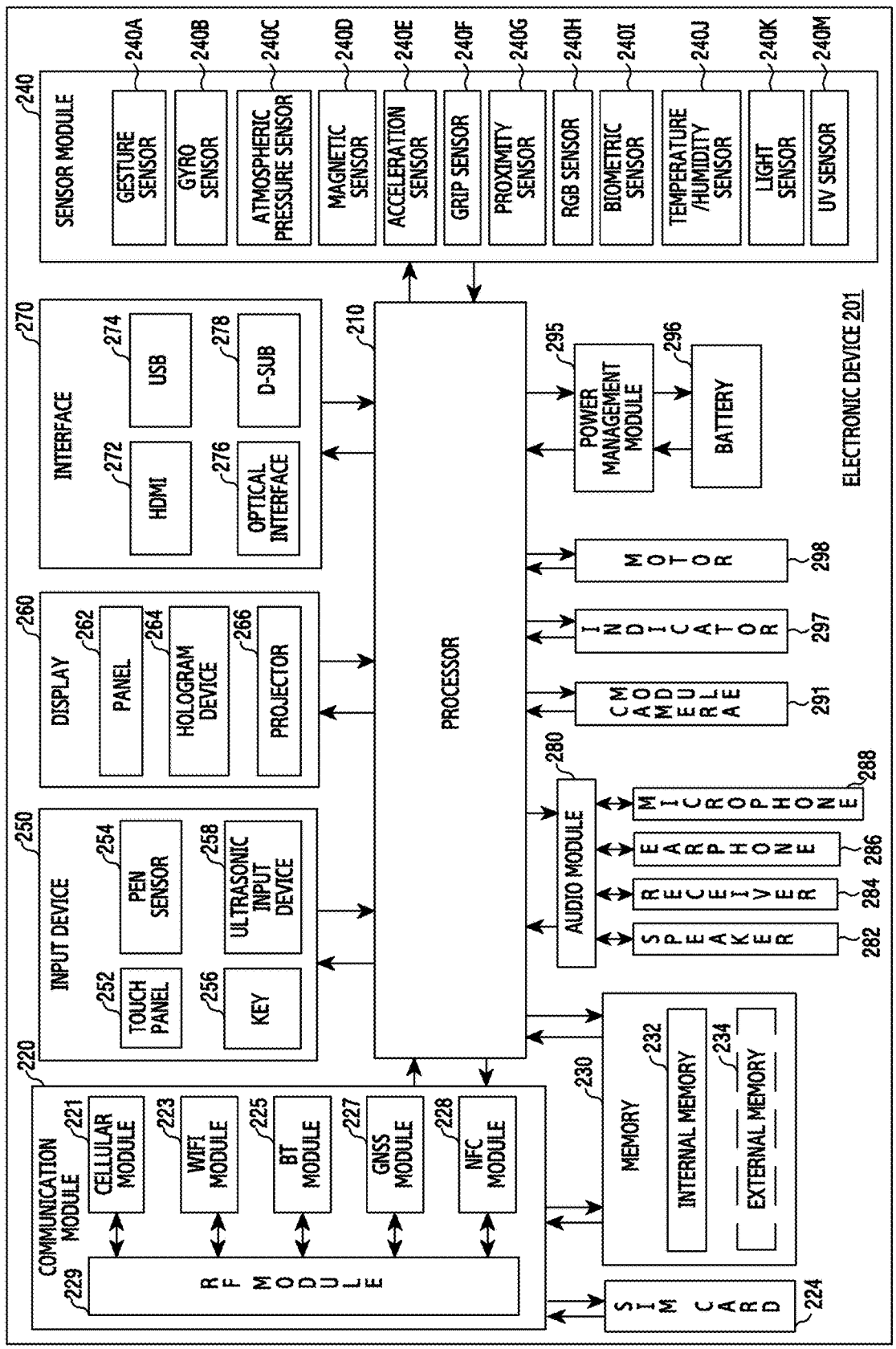
FIG. 2 is a block diagram of an electronic device, according to an embodiment of the present disclosure.

FIG. 2 is a block diagram of an electronic device 201, according to an embodiment of the present disclosure. The electronic device 201 includes the whole or a portion of the electronic device 101 illustrated in FIG. 1. The electronic device 201 may include at least one processor (e.g., an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may drive an operating system or an application program so as to control a plurality of hardware or software components connected thereto, and may also perform various data processing and arithmetic operations. The processor 210 may be implemented by a system-on-chip (SoC). The processor 210 may further include a graphic processing unit (GPU) and/or an image signal processor. The processor 210 may include at least some components (e.g., a cellular module 221) among the components illustrated in FIG. 2. The processor 210 may load a command or data received from at least one of the other components (e.g., a non-volatile memory) in a volatile memory to process the command and data, and may store various data in a non-volatile memory.

The communication module 220 may have a configuration that is the same as or similar to the communication interface 170 of FIG. 1. The communication module 220 may include the cellular module 221, a WiFi module 223, a BT module 225, a GNSS module 227 (e.g., GPS module, Glonass module, Beidou module, or Galileo module), an NFC module 228, and a Radio Frequency (RF) module 229.

The cellular module 221 may provide a voice call, a video call, a message service, or an internet service through a communication network. The cellular module 221 may perform discrimination and authentication of the electronic device 201 within the communication network by using the SIM 224. The cellular module 221 may perform at least some of the multimedia control functions that may be provided by the processor 210. The cellular module 221 may include a CP.

Each of the WiFi module 223, the Bluetooth module 225, the GNSS module 227, and the NFC module 228 may include a processor to process data transmitted/received through a corresponding module. At least some (e.g., two or more) of the cellular module 221, the WiFi module 223, the BT module 225, the GNSS module 227, and the NFC module 228 may be incorporated in a single integrated chip (IC) or an IC package.

The RF module 229 may transmit/receive a communication signal (e.g., an RF signal). The RF module 229 may include a transceiver, a power amp module (PAM), a frequency filter, a low noise amplifier (LNA), or an antenna. At least one of the cellular module 221, the WiFi module 223, the BT module 225, the GNSS module 227, and the NFC module 228 may transmit/receive an RF signal through one or more separate RF modules.

The SIM 224 may be an embedded SIM, and may also include intrinsic identification information (e.g., integrated circuit card identifier (ICCID)) or subscriber information (e.g., international mobile subscriber identity (IMSI)).

The memory 230 may include an internal memory 232 or an external memory 234. The internal memory 232 may include at least one of a volatile memory (e.g., dynamic random access memory (DRAM), static RAM (SRAM), or synchronous DRAM (SDRAM)), a non-volatile memory (e.g., one time programmable read only memory (OT-PROM), programmable ROM (PROM), erasable and programmable ROM (EPROM), electrically erasable and programmable ROM (EEPROM), mask ROM, flash ROM, flash memory (e.g., NAND flash memory, or NOR flash memory), hard drive, or solid state drive (SSD)).

The external memory 234 may further include a flash drive (e.g., a compact flash (CF), a secure digital (SD), a micro SD (Micro-SD), a mini SD (Mini-SD), an extreme digital (xD), a multi-media card (MMC), or memory stick). The external memory 234 may be functionally and/or physically connected to the electronic device 201 through various interfaces.

The electronic device 201 may include a socket (or a connector) that is capable of mounting a plurality of external memories at once. For example, a plurality of external memories may be coupled to a tray. When a tray to which a plurality of external memories are coupled is coupled to a socket, the plurality of external memories may be electrically connected to a plurality of contacts included in the socket.

The plurality of external memories may be arranged in a row in the direction in which the tray is coupled to the socket.

For example, the sensor module 240 may measure a physical quantity or may sense an operating status of the electronic device 201, and may then convert the measured or sensed information into electric signals. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature/humidity sensor 240J, an illuminance sensor 240K, and an ultra-violet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infra-red (IR) sensor, an iris sensor, and/or a fingerprint sensor. The sensor module 240 may further include a control circuit for controlling one or more sensors incorporated therein. The electronic device 201 may further include a processor configured to control the sensor module 240 as a part of the AP 210 or separate from the AP 210 so as to control the sensor module 240 while the AP 210 is in the sleep state.

At least a portion of the sensor module 240 may sense that at least one external storage medium is coupled to or detached from the electronic device 201.

At least a portion of the sensor module 240 may sense that a tray to which a plurality of external storage mediums may be coupled is coupled to or detached from the electronic device 201.

The input device 250 may include a touch panel 252, a (digital) pen sensor 254, a key 256, or an ultrasonic input device 258. As the touch panel 252, at least one of a capacitive type touch panel, a resistive type touch panel, an infrared type touch panel, and an ultrasonic type panel may be used. Also, the touch panel 252 may further include a control circuit. The touch panel 252 may further include a tactile layer so as to provide a tactile reaction to the user.

The (digital) pen sensor 254 may be a portion of the touch panel or may include a separate recognition sheet. The key 256 may include a physical button, an optical key, or a keypad. The ultrasonic input device 258 may sense, through a microphone 288, ultrasonic waves generated by an input tool so as to confirm data corresponding to the sensed ultrasonic waves.

The display 260 may include a panel 262, a hologram device 264, or a projector 266. The panel 262 may include a configuration that is the same as or similar to that of the display 160 of FIG. 1. The panel 262 may be implemented to be flexible, transparent, or wearable. The panel 262 may be configured as a single module with the touch panel 252. The hologram device 264 may show a stereoscopic image in the air using interference of light. The projector 266 may project light onto a screen so as to display an image. The screen may be located inside or outside the electronic device 201. The display 260 may further include a control circuit to control the panel 262, the hologram device 264, or the projector 266.

The interface 270 may include an HHDMI 272, a USB 274, an optical interface 276, or a d-subminiature (D-sub) 278. For example, the interface 270 may be included in the communication interface 170 illustrated in FIG. 1. Additionally or alternatively, the interface 270 may include a mobile high-definition link (MHL) interface, an SD card/MMC interface, or an infrared data association (IrDA) standard interface.

The audio module 280 may bi-directionally convert, for example, sound and electric signals. At least some of the components of the audio module 280 may be included in, for example, the input/output interface 145 illustrated in FIG. 1. The audio module 280 may process sound information input or output through, for example, a speaker 282, a receiver 284, an earphone 286, or the microphone 288.

The camera module 291 is a device that is capable of photographing, for example, a still image and a video image, and the camera module 2910 may include at least one image sensor (e.g., a front sensor or a back sensor), a lens, an image signal processor (ISP), or a flash (e.g., LED or xenon lamp).

The power management module 295 may manage the electric power of the electronic device 201. The power management module 295 may include a power management integrated circuit (PMIC), a charger IC, or a battery gauge. The PMIC may be configured as a wired and/or wireless charge type. The wireless charging type may include a magnetic resonance type, a magnetic induction type, or an electromagnetic wave type, and may further include an additional circuit for wireless charging (e.g., a coil loop, a resonance circuit, or a rectifier). The battery gauge may measure the residual capacity of the battery 296, and a voltage, a current, or a temperature during the charge. The battery 296 may include a rechargeable battery and/or a solar battery.

The indicator 297 may indicate a specific status (e.g., a booting status, a message status, or a charged status) of the electronic device 201 or of a part thereof (e.g., AP 210). The motor 298 may convert an electric signal into a mechanical vibration, and may generate a vibration or a haptic effect. Although not illustrated, the electronic device 201 may include a processor (e.g., a GPU) to support a mobile TV. The processor to support a mobile TV may process media data according to the standards of, for example, digital multimedia broadcasting (DMB), digital video broadcasting (DVB), or media Flo™.

Each of the above-described component elements of hardware may be configured with one or more components, and the names of the corresponding component elements may vary based on the type of electronic device. The electronic device 201 may include at least one of the above-described elements. Some of the above-described elements may be omitted from the electronic device, or the electronic device may further include additional elements. Also, some of the hardware components may be combined into one entity, which may perform functions identical to those of the relevant components before the combination.

Figure 3A:
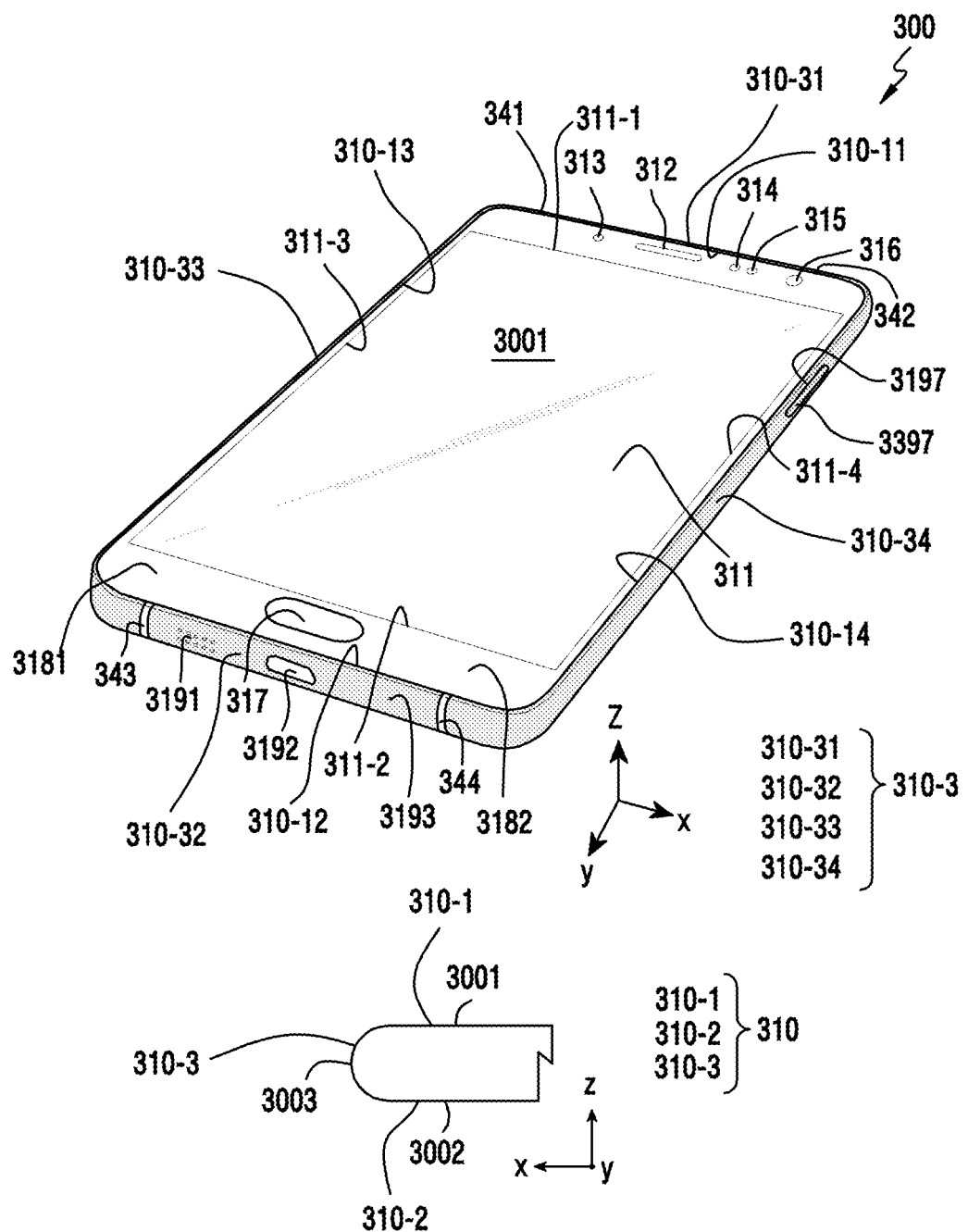
FIGS. 3A and 3B are perspective views of an electronic device, according to an embodiment of the present disclosure.
Figure 3B:
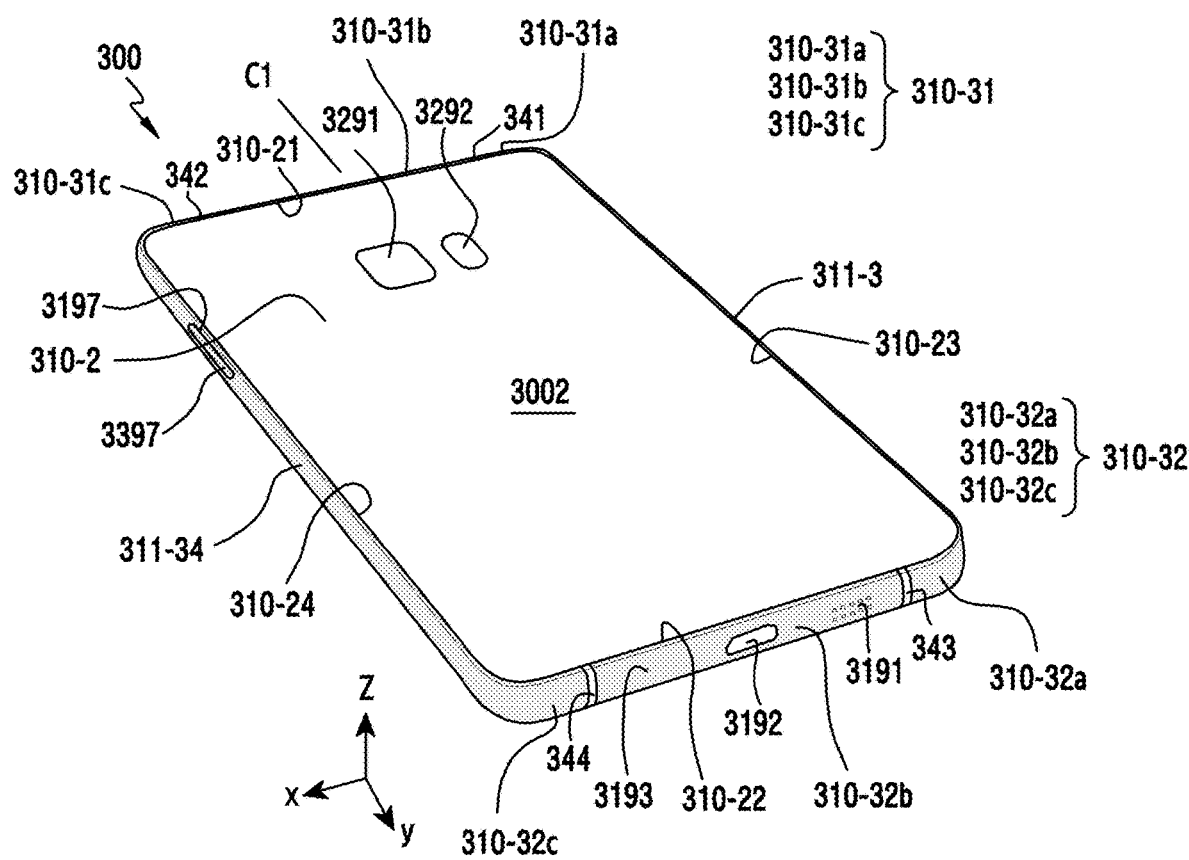

FIGS. 3A and 3B are perspective views of an electronic device 300, according to an embodiment of the present disclosure. An electronic device 300 may include at least some of the constituent elements of the electronic device 101 of FIG. 1 or the electronic device 201 of FIG. 2.

The electronic device 300 includes a housing 310 that forms all or at least a portion of the exterior of the electronic device 300. The housing 310 may include a non-metallic member and/or a metallic material. For example, the housing 310 may be formed of materials, such as a plastic, a metal, carbon fiber and other fiber composites, ceramics, glass, and wood, or a combination thereof. Alternatively, the housing 310 may be entirely formed of one material or a combination of a plurality of materials. Alternatively, the housing 310 may be formed of materials having partially different physical properties.

The housing 310 may form a first face 3001, a second face 3002, and a third face 3003 of the electronic device 300. The first face 3001 and the second face 3002 may face opposite directions. The third face 3003 may surround a space between the first face 3001 and the second face 3002.

The first face 3001 and/or the second face 3002 of the housing 310 may be a substantially flat face. The third face 3003 of the housing 310 may include a flat face or a curved face.

The housing 310 may include a first cover 310-1 forming the first face 3001 and a second cover 310-2 forming the second face 3002. In addition, the housing 310 may also include a bezel 310-3 that surrounds the space between the first cover 310-1 and the second cover 310-2 and forms the third surface 3003.

The electronic device 300 may include a display 311 embedded within the space formed by the first cover 310-1 and the second cover 310-2 of the housing 310. The screen region of the display 311 may be exposed to the outside through the first cover 310-1. The display 311 may further include a touch sensing device for performing a touch input and/or hovering input. For example, when a finger or a stylus touches the first surface 3001, the electronic device 300 may sense the touch input through the display 311. Alternatively, when the finger or stylus is closely spaced apart from the first side 3001, the electronic device 300 may sense the hovering input using the display 311.

The screen region of the display 311 may have a rectangular shape that includes a first short side 311-1, a second short side 311-2, a first long side 311-3, and a second long side 311-4.

The first cover 310-1 may have a rectangular shape that includes a $(1-1)^{th}$ edge 310-11 adjacent to the first short side 311-1 of the screen region, a $(1-2)^{th}$ edge 310-12 adjacent to the second short side 311-2 of the screen region, a $(1-3)^{th}$ edge 310-13 adjacent to the third short side 311-3 of the screen region, and a $(1-4)^{th}$ edge 310-14 adjacent to the fourth short side 311-4 of the screen region. The $(1-3)^{th}$ edge 310-13 may connect one end of the $(1-1)^{th}$ edge 310-11 and one end of the $(1-2)^{th}$ edge 310-12. The $(1-4)^{th}$ edge 310-14 may connect the other end of the $(1-1)^{th}$ edge 310-11 and the other end of the $(1-2)^{th}$ edge 310-12. The connecting portion between the $(1-1)^{th}$ edge 310-11 and the $(1-3)^{th}$ edge 310-13 may have a curved shape. The connecting portion between the $(1-1)^{th}$ edge 310-11 and the $(1-4)^{th}$ edge 310-14 may have curved shape. The connecting portion between the $(1-2)^{th}$ edge 310-12 and the $(1-3)^{th}$ edge 310-13 may have a curved shape. Alternatively, the connecting portion between the $(1-2)^{th}$ edge 310-12 and the $(1-4)^{th}$ edge 310-14 may have a curved shape.

When viewed in the direction from the first cover 310-1 toward the second cover 310-2, the second cover 310-2 may have a substantially rectangular shape corresponding to the first cover 310-1.

The electronic device 300 may include various components disposed between the $(1-1)^{th}$ edge 310-11 of the first cover 310-1 and the first short side 311-1 of the screen region. For example, the components may include a receiver 312 for outputting a voice signal, which is received from a counterpart device during a call, as sound. For example, the components may include one or more sensors 313, 314, and 315. The one or more sensors may include an optical sensor (e.g., an illuminance sensor), a proximity sensor, an infrared sensor, an ultrasonic sensor, or the like (see FIG. 2 for example). The components may include a camera 316 that includes an image sensor.

The electronic device 300 may include various components disposed between the $(1\text{-}2)^{th}$ edge 310-12 of the first cover 310-1 and the second short side 311-2 of the screen region. For example, the components may be a variety of input keys. An input key may be a push-type button (e.g., a home button) 317. Alternatively, an input key may be a touch-type touch key 3181 or 3182.

In the electronic device 300, the second cover 310-2 may have a rectangular shape that includes a $(2\text{-}1)^{th}$ edge 310-21 corresponding to the $(1\text{-}1)^{th}$ edge 310-11 of the first cover 310-1, a $(2\text{-}2)^{th}$ edge 310-22 corresponding to the $(1\text{-}2)^{th}$ edge 310-12 of the first cover 310-1, a $(2\text{-}3)^{th}$ edge 310-23 corresponding to the $(1\text{-}3)^{th}$ edge 310-13 of the first cover 310-1, and a $(2\text{-}4)^{th}$ edge 310-24 corresponding to the $(1\text{-}4)^{th}$ edge 310-14 of the first cover 310-1. The $(2\text{-}3)^{th}$ edge 310-23 may connect one end of the $(2\text{-}1)^{th}$ edge 310-21 and one end of the $(2\text{-}2)^{th}$ edge 310-22. The $(2\text{-}4)^{th}$ edge 310-24 may connect the other end of the $(2\text{-}1)^{th}$ edge 310-21 and the other end of the $(2\text{-}2)^{th}$ edge 310-22. The connecting portion between the $(2\text{-}1)^{th}$ edge 310-21 and the $(2\text{-}3)^{th}$ edge 310-23 may have a curved shape. The connecting portion between the $(2\text{-}1)^{th}$ edge 310-21 and the $(2\text{-}4)^{th}$ edge 310-24 may have a curved shape. The connecting portion between the $(2\text{-}2)^{th}$ edge 310-22 and the $(2\text{-}3)^{th}$ edge 310-23 may have a curved shape. Alternatively, the connecting portion between the $(2\text{-}2)^{th}$ edge 310-22 and the $(2\text{-}4)^{th}$ edge 310-24 may have a curved shape.

The electronic device 300 may include various components (e.g., a camera 3291 and a flash 3292) disposed in the second cover 310-2.

The first cover 310-1 and/or the second cover 310-2 may be formed of a transparent material (e.g., glass).

The bezel 310-3 may include a first metal frame 310-31 that interconnects the $(1\text{-}1)^{th}$ edge 310-11 of the first cover 310-1 and the $(2\text{-}1)^{th}$ edge 310-21 to the second cover 310-2. The bezel 310-3 may include a second metal frame 310-32 that interconnects the $(1\text{-}2)^{th}$ edge 310-12 of the first cover 310-1 and the $(2\text{-}2)^{th}$ edge 310-22 of the second cover 310-2. The bezel 310-3 may include a third metal frame 310-33 that interconnects the $(1\text{-}3)^{th}$ edge 310-13 of the first cover 310-1 and the $(2\text{-}3)^{th}$ edge 310-23 of the second cover 310-2. The bezel 310-3 may include a fourth metal frame 310-34 that interconnects the $(1\text{-}4)^{th}$ edge 310-14 of the first cover 310-1 and the $(2\text{-}4)^{th}$ edge 310-24 of the second cover 310-2. The first metal frame 310-31 and the second metal frame 310-32 are disposed opposite to each other, and the third metal frame 310-33 and the fourth metal frame 310-34 are disposed opposite to each other. The first metal frame 310-31 may connect one end of the third metal frame 310-33 and one end of the fourth metal frame 310-34. The second metal frame 310-32 may connect the other end of the third metal frame 310-33 and the other end of the fourth metal frame 310-34. The combination of the first metal frame 310-31, the second metal frame 310-32, the third metal frame 310-33, and the fourth metal frame 310-34 may have a substantially rectangular annular shape. The third face 3003 of the housing 310, which is formed by the bezel 310-3, may have a substantially rectangular annular shape.

The connecting portion between the first metal frame 310-31 and the third metal frame 310-33 of the bezel 310-3 may have a curved shape. The connecting portion between the first metal frame 310-31 and the fourth metal frame 310-34 of the bezel 310-3 may have a curved shape. The connecting portion between the second metal frame 310-32 and the third metal frame 310-33 of the bezel 310-3 may have a curved shape. Alternatively, the connecting portion between the second metal frame 310-32 and the fourth metal frame 310-34 of the bezel 310-3 may have a curved shape.

The bezel 310-3 may include an extension extending inwardly of the housing 310 from at least one of the first metal frame 310-31, the second metal frame 310-32, the third metal frame 310-33, and the fourth metal frame 310-34. The extension may be coupled to a printed circuit board (PCB), a bracket, or the like.

At least one of the first metal frame 310-31, the second metal frame 310-32, the third metal frame 310-33, and the fourth metal frame 310-34 of the bezel 310-3 may include a plurality of metal portions that are physically separated from each other. A non-conductive member may be disposed between the plurality of metal portions. The non-conductive member may form a portion of the third face 3003 of the housing 310. Alternatively, the non-conductive member may be one extending from the non-conductive portion disposed within the housing 310.

The first metal frame 310-31 of the bezel 310-3 may include a $1a^{th}$ metal frame 310-31a, a $1b^{th}$ metal frame 310-31b, and a $1c^{th}$ metal frame 310-31c, which are physically separated from each other. The $1b^{th}$ metal frame 310-31b may be disposed between the $1a^{th}$ metal frame 310-31a and the $1c^{th}$ metal frame 310-31c.

The $1a^{th}$ metal frame 310-31a of the first metal frame 310-31 may be connected to the third metal frame 310-33. The $1c^{th}$ metal frame 310-31c of the first metal frame 310-31 may be connected to the fourth metal frame 310-34. The $1a^{th}$ metal frame 310-31a and the third metal frame 310-33 may be formed of an integral metal. The $1c^{th}$ metal frame 310-31c and the fourth metal frame 310-34 may be formed of an integral metal.

The electronic device 300 may include a first non-conductive member 341 disposed between the $1a^{th}$ metal frame 310-31a and the $1b^{th}$ metal frame 310-31b of the bezel 310-3. The electronic device 300 may include a second non-conductive member 342 disposed between the $1b^{th}$ metal frame 310-31b and the $1c^{th}$ metal frame 310-31c. The first non-conductive member 341 and the second non-conductive member 342 may be smoothly connected to the first metal frame 310-31, and may form a portion of the third surface 3003 of the first housing 310. The first non-conductive member 341 and/or the second non-conductive member 342 may be a portion extending from a non-conductive member disposed inside the housing 310.

The electronic device 300 may have a generally symmetrical configuration on both sides of the center line C1 that extends from the first metal frame 310-31 to the second metal frame 310-32. The center line C1 is present between the first non-conductive member 341 and the second non-conductive member 342, and the first non-conductive member 341 and the second non-conductive member 342 may be placed at the same distance from the center line C1. Alternatively, the first non-conductive member 341 and the second non-conductive member 342 may not be disposed at the same distance from the center line C1.

A first gap between the $1a^{th}$ metal frame 310-31a and the $1b^{th}$ metal frame 310-31b may be a portion that is filled with the first non-conductive member 341. A second gap between the $1b^{th}$ metal frame 310-31b and the $1c^{th}$ metal frame 310-31c may be a portion that is filled with the second non-conductive member 342. The widths of the first gap and the second gap may be the same as each other, or may be different from each other.

The second metal frame 310-32 of the bezel 310-3 may include a $2a^{th}$ metal frame 310-32a, a $2b^{th}$ metal frame 310-32b, and a $2c^{th}$ metal frame 310-32c, which are physically separated from each other. The $2b^{th}$ metal frame 310-32b may be disposed between the $2a^{th}$ metal frame 310-32a and the $1c^{th}$ metal frame 310-31c.

The $2a^{th}$ metal frame 310-32a of the second metal frame 310-32 may be connected to the third metal frame 310-33. The $2c^{th}$ metal frame 310-32c of the second metal frame 310-32 may be connected to the fourth metal frame 310-34. The $2a^{th}$ metal frame 310-32a and the third metal frame 310-33 may be formed of an integral metal. The $2c^{th}$ metal frame 310-32c and the fourth metal frame 310-34 may be formed of an integral metal.

The electronic device 300 may include a third non-conductive member 343 disposed between the $2a^{th}$ metal frame 310-32a and the $2b^{th}$ metal frame 310-32b of the bezel 310-3. The electronic device 300 may include a fourth non-conductive member 344 disposed between the $2b^{th}$ metal frame 310-32b and the $2c^{th}$ metal frame 310-32c. The third non-conductive member 343 and the fourth non-conductive member 344 may be smoothly connected to the second metal frame 310-32, and may form a portion of the third surface 3003 of the housing 310. The third non-conductive member 343 and/or the fourth non-conductive member 344 may be a portion extending from a non-conductive member disposed inside the housing 310.

The center line C1 is present between the third non-conductive member 343 and the fourth non-conductive member 344, and the third non-conductive member 343 and the fourth non-conductive member 344 may be placed at the same distance from the center line C1. Alternatively, the third non-conductive member 343 and the fourth non-conductive member 344 may not be disposed at the same distance from the center line C1.

A third gap between the $2a^{th}$ metal frame 310-32a and the $2b^{th}$ metal frame 310-32b may be a portion that is filled with the third non-conductive member 343. A fourth gap between the $2b^{th}$ metal frame 310-32b and the $2c^{th}$ metal frame 310-32c may be a portion that is filled with the fourth non-conductive member 344. The widths of the third gap and the fourth gap may be the same as each other, or may be different from each other.

The first non-conductive member 341 and the third non-conductive member 343 may be disposed at the same distance from a center line C1 or may not be disposed at the same distance from the center line C1.

The second non-conductive member 342 and the fourth non-conductive member 344 may be disposed at the same distance from the center line C1 or may not be disposed at the same distance from the center line C1.

The bezel 310-3 may be used as at least a portion of a wireless communication device. Through the electrical coupling among the first metal frame 310-31, the second metal frame 310-32, the third metal frame 310-33, and the fourth metal frame 310-34, the bezel 310-3 may be used as at least a portion of the wireless communication device of the electronic device 300 that is capable of transmitting and receiving wireless signals. For example, at least a portion of the bezel 310-3 may be set to a "first state" that is electrically connected to a communication circuit of the electronic device 300 to serve as an antenna radiator. For example, at least a portion of the bezel 310-3 may be set to a "second state" that is electrically connected to a ground member (e.g., a ground of a PCB) of the electronic device 300 to serve as an antenna ground. Alternatively, at least a portion of the bezel 310 may be set to a "third state" that is an electrical floating state.

The electronic device 300 may include at least one conductive pattern disposed on a plane between the first face 3001 and the second face 3002. The plane on which the at least one conductive pattern is disposed may extend in substantially the same direction as the first face 3001 or the second face 3002. According to various embodiments, at least a part of the plane on which the at least one conductive pattern is disposed may be substantially parallel to at least a part of the first face 3001 or the second face 3002.

The conductive pattern may include a conductive line extending from a first end to a second end to form a winding portion of a plurality of turns.

When viewed from above the plane, the plane may include an annular inner periphery (or a first boundary) that is surrounded by at least a portion of the innermost turn of the plurality of turns, and an annular outer periphery (or a second boundary) that surrounds at least a portion of the outermost turn of the plurality of turns. When viewed from above the plane, the winding portion may include a first winding portion that is disposed between the first boundary and the second boundary of the plane. Also, when viewed from above the plane, the winding portion may include a second winding portion that is disposed inside the first boundary of the plane, outside the second boundary, or between the first boundary and the second boundary. The second winding portion may include a first end and a second end.

At least one conductive pattern may be used as an antenna for wireless charging. For example, at least one conductive pattern may be used as an antenna for resonant wireless charging. Also, at least one conductive pattern may be used as an antenna for inductive wireless charging.

At least one conductive pattern may be used as an antenna for various types of communication. For example, at least one conductive pattern may be used for cellular communication, short range communication (e.g., WiFi, BT, NFC, or GNSS), transmission/reception of a magnetic signal (e.g., MST for electronic settlement), or the like.

The electronic device 300 may include an electronic circuit electrically connected to at least one conductive pattern. The electronic circuit may be electrically connected to a first point located on or near the first end of the conductive pattern, and to a second point located on or near the second end of the conductive pattern.

An electronic circuit electrically connected to the conductive pattern may include a wireless charging circuit for receiving and/or transmitting power using at least one conductive pattern. Alternatively, an electronic circuit electrically connected to the conductive pattern may include a communication circuit for performing various types of communication using at least one conductive pattern.

The bezel 310-3 may include a through-hole in order to support various components of the electronic device 300. For example, the $2b^{th}$ metal frame 310-32b of the bezel 310-3 may include a through hole 3191 used for emitting sound, which is generated from a speaker of the electronic device 300, to the outside. Alternatively, the $(1-2b)^{th}$ metal frame 310-32b of the bezel 310-3 may include a through-hole 3192 used to connect an external connector to a connector of the electronic device 300. Alternatively, the $2b^{th}$ metal frame 310-32b of the bezel 310-3 may include a through-hole 3193 used to introduce external sound into a microphone of the electronic device 300. Alternatively, the third metal frame 310-33 of the bezel 310 may include a through-hole for supporting a button (e.g., a volume control button) of the electronic device 300. Alternatively, the fourth metal frame 310-34 of the bezel 310 may include a through-hole 3197 for supporting a button (e.g., a power button) 3397 of the electronic device 300. Alternatively, the $1b^{th}$ metal frame 310-31b of the bezel 310-3 may include a through-hole used to insert an ear plug into the ear jack of the electronic device 300. Alternatively, the 1b<sup>th</sup> metal frame 310-31b of the bezel 310 may include a through-hole used to insert at least one external storage medium into a socket of the electronic device 300.

Figure 4:
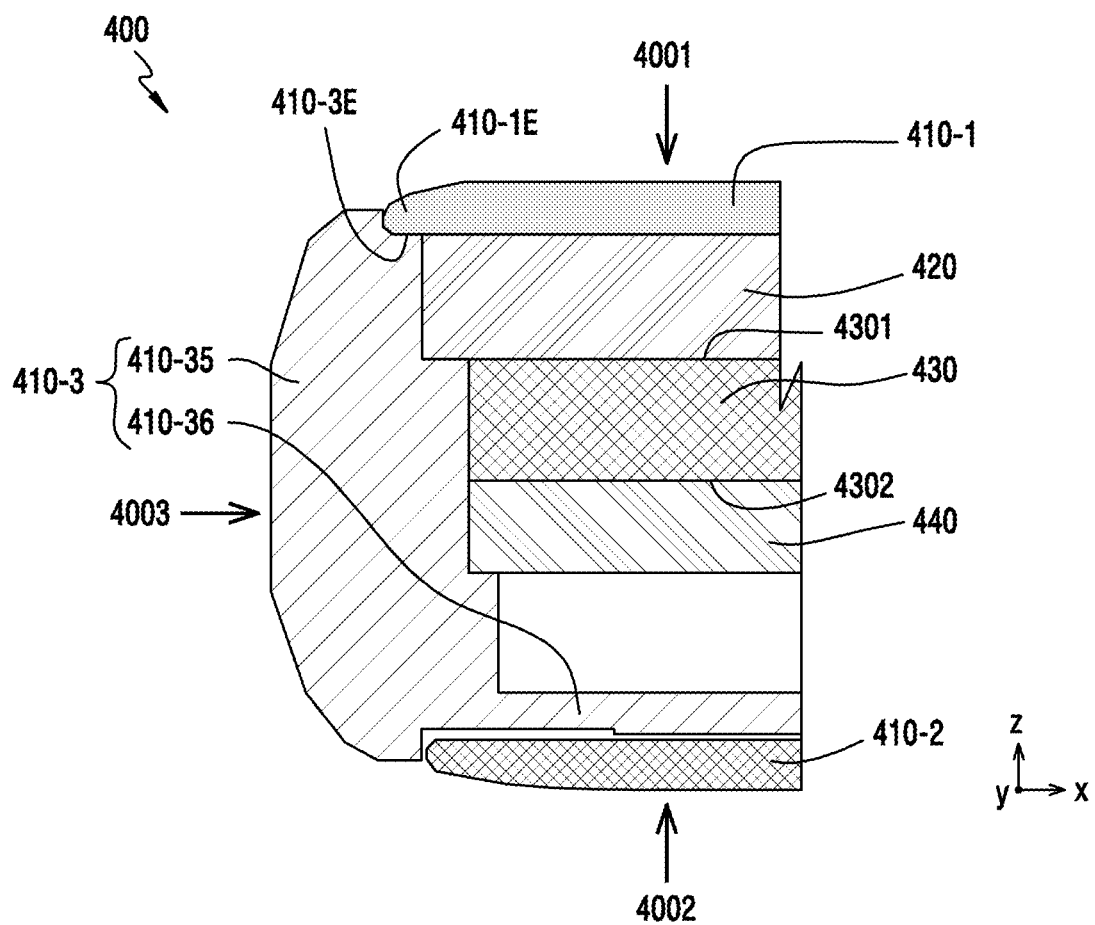
FIG. 4 is a cross-sectional view of an electronic device, according to an embodiment of the present disclosure.

FIG. 4 is a cross-sectional view of an electronic device 400, according to an embodiment of the present disclosure. The electronic device 400 may be any one of the electronic device 102 of FIG. 1, the electronic device 201 of FIG. 2, and the electronic device 300 of FIG. 3A.

Referring to FIG. 4, the exterior of the electronic device 400 may include a first face 4001 facing a first direction and a second face 4002 facing a second direction that is opposite to the first direction. In addition, the exterior of the electronic device 400 may include a third face 4003 that encloses the space between the first face 4001 and the second face 4002.

The electronic device 400 may include a first cover 410-1, a display 420, a bracket 430, a circuit board 440, a case 410-3, and a second cover 410-2.

The first cover 410-1 (e.g., window) is substantially plate-shaped, and may include impact-resistant plastic or glass. The first cover 410-1 may be coupled to the case 410-3, and may form the first face 4001 of the electronic device 400 (e.g., the first face 3001 of FIG. 3A). For example, an annular edge 410-1E of the first cover 410-1 may be coupled to an annular mounting portion 410-3E of the case 410-3 using a coupling means (e.g., a double-sided tape). When the first cover 410-1 and the case 410-3 are coupled to each other, a space capable of accommodating the display 420, the bracket 430, and the circuit board 440 may be provided.

The display 420 may be disposed between the first cover 410-1 and the bracket 430. For example, the display 420 may be coupled to the first cover 410-1. The screen region of the display 420 may be exposed to the outside through the first cover 410-1.

The display 420 may display an electrical signal provided from the circuit board 440 as an image, and may include, for example, an LCD, an OLED (e.g., an AMOLED).

The display 420 may further include a conductive pattern for a touch input or a hovering input. For example, the conductive pattern may be disposed in an in-cell region or an on-cell region of the display 420.

The display 420 may include a display-integrated touch screen. For example, the display 420 may include an AMOLED-integrated touch screen (on-cell TSP AMOLED (OCTA)).

The bracket 430 may be disposed between the display 420 and the circuit board 440. The bracket 430 may be coupled to the case 410-3, and may include a first face 4301 on which the display 420 may be mounted, and a second face 4302 on which the circuit board 440 may be mounted. The first face 4301 may face the first face 4001 of the electronic device 400, and the second face 4302 may face the second face 4002 of the electronic device 400.

The circuit board 440 (e.g., a main board, a mother board, or a printed board assembly (PBA)) may be configured to include a plurality of electronic components mounted thereon and an electrical circuit to interconnect the plurality of electronic components. The circuit board 440 may set an execution environment of the electronic device 400, may maintain the information of the electronic device 400, and may support the data input/out and exchange of the electronic components within the electronic device 400. For example, the circuit board 440 may include a wireless charging circuit for receiving and/or transmitting power using at least one conductive pattern equipped in the electronic device 400. Also, the circuit board 440 may include a communication circuit for receiving and/or transmitting signals related to various forms of communication using at least one conductive pattern equipped in the electronic device 400.

The case 410-3 (e.g., the bezel 310-3 in FIG. 3A) may have a substantially container shape opened in a direction from the second face 4002 of the electronic device 400 toward the first face 4001, and may form the overall framework of the electronic device 400. Various components (e.g., the display 420, the bracket 430, and the circuit board 440) may be installed in the framework structure that is configured with the case 410-3.

The case 410-3 may include a first portion 410-35 that forms a third face 4003 of the electronic device 400, a second portion 410-36 that extends from the first portion 410-35 and is disposed between the circuit board 400 and the second cover 410-2.

The second portions 410-36 of the case 410-3 may provide at least a portion of a space for receiving a battery.

The second cover 410-2 can be coupled to the second portions 410-36 of the case 410-3 and may form the second face 4002 of the electronic device 400. The second portion 410-36 of the case 410-3 has a groove-like shape capable of placing the second cover 410-2 therein, and the second cover 410-2 may be fitted to the second portion 410-36 of the case 410-3 without a clearance.

The second cover 410-2 may be easily removable from the electronic device 400. For example, the second cover 410-2 may be snap-fit coupled to the electronic device 400.

The electronic device 400 may include at least one conductive pattern (e.g., a conductive coil) disposed between the circuit board 440 and the second cover 410-2. For example, at least one conductive pattern may be coupled to the second cover 410-2, or may be included in the second cover 410-2. Alternatively, at least one conductive pattern may be disposed between the battery and the second cover 410-2.

At least one conductive pattern may be disposed on a plane between the first face 4001 and the second face 4002. The plane on which the at least one conductive pattern is disposed may be substantially parallel to the first face 4001 or the second face 4002.

The conductive pattern may include a conductive line extending from a first end to a second end to form a winding portion of a plurality of turns.

When viewed from above the plane on which the conductive pattern is disposed, the plane may include an annular first boundary that is surrounded by at least a portion of the innermost turn of the plurality of turns, and an annular second boundary that surrounds at least a portion of the outermost turn of the plurality of turns. When viewed from above the plane, the winding portion may include a first winding portion that is disposed between the first boundary and the second boundary of the plane. Also, when viewed from above the plane, the winding portion may include a second winding portion that is disposed inside the first boundary of the plane, outside the second boundary, or between the first boundary and the second boundary. The second winding portion may include a first end and a second end.

At least one conductive pattern may be used as an antenna for wireless charging. Alternatively, at least one conductive pattern may be used as an antenna for various types of communication.

Figure 5:
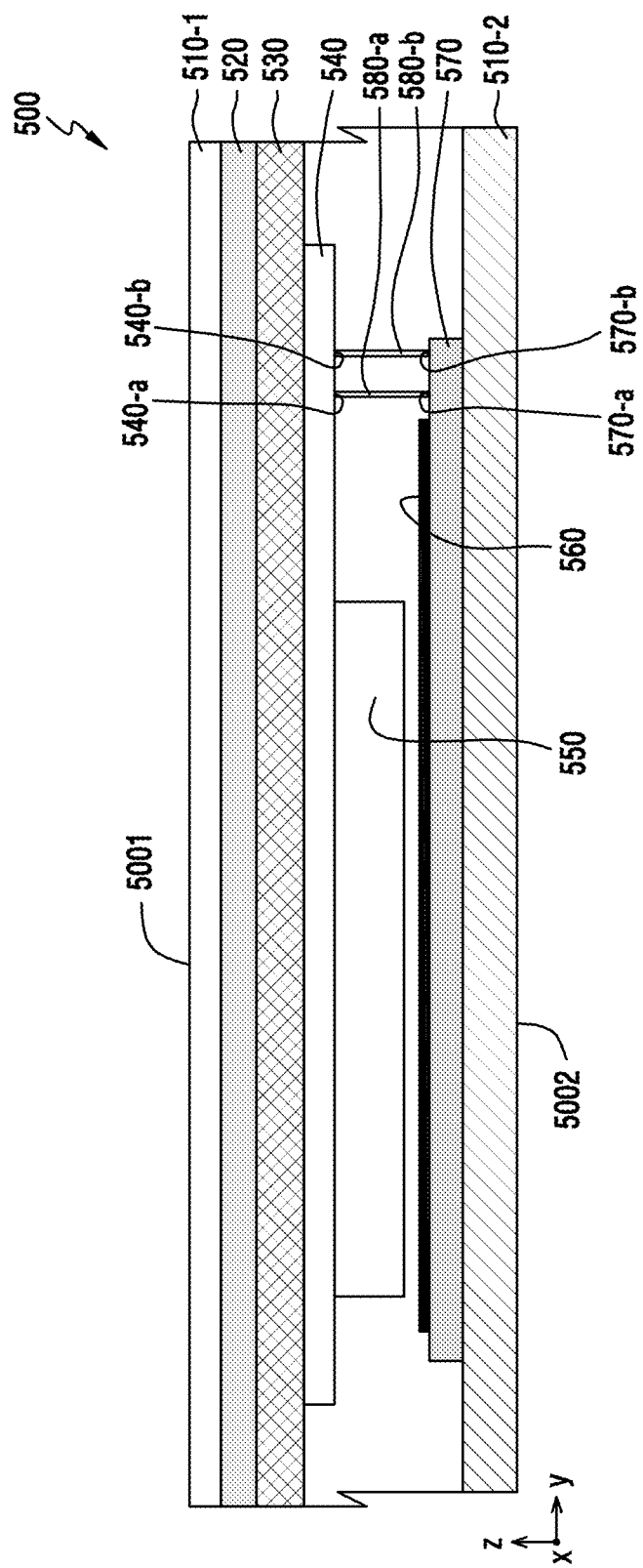
FIG. 5 is a cross-sectional view of an electronic device, according to an embodiment of the present disclosure.

FIG. 5 is a cross-sectional view of an electronic device 500, according to an embodiment of the present disclosure. The electronic device 500 may be any one of the electronic device 102 of FIG. 1, the electronic device 201 of FIG. 2, the electronic device 300 of FIG. 3A, and the electronic device 400 of FIG. 4.

Referring to FIG. 5, the exterior of the electronic device 500 may include a first face 5001 facing a first direction and a second face 5002 facing a second direction that is opposite to the first direction. The electronic device 500 may include various components disposed between the first face 5001 and the second face 5002.

The electronic device 500 may include a first cover 510-1, a display 520, a bracket 530, a circuit board 540, a battery 550, at least one conductive pattern 570, or a second cover 510-2. The first cover 510-1, the display 520, the bracket 530, the circuit board 540, and the second cover 510-2 may be at least partially similar to the first cover 410-1, the display 420, the bracket 430, the circuit board 440, and the second cover 410-2 of FIG. 5, respectively, and a detailed description thereof will be omitted.

The battery 550 may be disposed between the bracket 530 and the at least one conductive pattern 570.

At least one conductive pattern 570 may be disposed on a plane between the first face 5001 and the second face 5002. The plane on which the at least one conductive pattern 570 is disposed may extend in substantially the same direction as the first face 5001 or the second face 5002. According to various embodiment, at least a part of the plane on which the at least one conductive pattern is disposed may be substantially parallel to at least a part one the first face 3001 or the second face 3002.

At least one conductive pattern 570 may be disposed between the battery 550 and the second face 5002. For example, the at least one conductive pattern 570 may be disposed on the second cover 510-2. Alternatively, the at least one conductive pattern 570 may be included in the second cover 510-2.

The conductive pattern may include a conductive line extending from a first end to a second end to form a winding portion of a plurality of turns.

The at least one conductive pattern 570 may be electrically connected to the circuit board 540. The conductive pattern 570 may include a first contact 570-a and a second contact 570-b so as to be electrically connected to the circuit board 540. The first contact 570-a may be located at or near the first end of the conductive line. Alternatively, the second contact 570-b may be located at or near the second end of the conductive line. The circuit board 540 may include a first contact 540-a and a second contact 540-b so as to be electrically connected to the conductive pattern 570. When the circuit board 540 and the conductive pattern 570 are installed in the electronic device 500, the first contact 570-a of the conductive pattern 570 may be electrically connected to the first contact 540-a of the circuit board 540, and the second contact 570-b of the conductive pattern 570 may be electrically connected to the second contact 540-b of the circuit board 540.

The first contact 540-a and the second contact 540-b of the circuit board 540 may be electrically connected to a wireless charging circuit. Alternatively, the first contact 540-a and the second contact 540-b of the circuit board 540 may be electrically connected to a communication circuit. For example, the first contact 540-a of the circuit board 540 may be provided for feeding, and the second contact 540-b may be electrically connected to a ground member (e.g., a PCB ground) of the electronic device 500.

The electronic device 500 may include a first electrical connecting means 580-a to electrically connect the first contact 540-a of the circuit board 540 and the first contact 570-a of the conductive pattern 570 to each other. The electronic device 500 may include a second electrical connecting means 580-b to electrically connect the second contact 540-a of the circuit board 540 and the second contact 570-b of the conductive pattern 570 to each other. For example, the first electrical connecting means 580-a and/or the second electrical connecting means 580-b may include a C-clip, a pogo-pin, a spring, a conductive poron or rubber, a conductive tape or a copper connector, and the like. The first electrical connecting means 580-a and/or the second electrical connecting means 580-b may be coupled to the circuit board 540 or the conductive pattern 570.

When viewed from above the plane ("conductive pattern mounting plane") on which the conductive pattern is disposed, the conductive pattern mounting plane may include an annular first boundary that is surrounded by at least a portion of the innermost turn of the plurality of turns, and an annular second boundary that surrounds at least a portion of the outermost turn of the plurality of turns. When viewed from above the conductive pattern mounting plane, the winding portion of the conductive pattern may include a first winding portion disposed between the first boundary and the second boundary of the conductive pattern mounting plane. Also, when viewed from above the conductive pattern mounting plane, the winding portion of the conductive pattern may include a second winding portion that is disposed inside the first boundary of the conductive pattern mounting plane, outside the second boundary, or between the first boundary and the second boundary. The second winding portion may include both the first contact 570-a and the second contact 570-b.

At least one conductive pattern 570 may be used as an antenna for wireless charging. Alternatively, the at least one conductive pattern 570 may be used as an antenna for various types of communication.

The electronic device 500 may further include an electrical shield member 560 disposed between the battery 550 and the at least one conductive pattern 570. The electrical shielding member 570 may prevent the resonant characteristic of the at least one conductive pattern 570 from interfering with and deteriorating the surroundings (e.g., the battery 550).

The electrical shield member 560 may include a ferrite sheet.

The second cover 510-2 may include a transparent layer. The transparent layer may be formed of a plastic material (e.g., acrylic) or a glass material that has impact resistance. For example, the transparent layer may be formed of tempered glass.

The second cover 510-2 may have a color. For example, the second cover 510-2 may include a color layer including a dye, a pigment, a coloring matter, a fluorescent material, or a phosphor that develops a predetermined color.

The second cover 510-2 may further include a plastic film. The plastic film may be formed of a material having high thermal stability and high mechanical strength. For example, the plastic film may be a polyester (PET) film, a polycarbonate (PC) film, a polyethylene (PE) film, a polypropylene (PP) film, or the like.

The second cover 510-2 may further include a pattern layer. The pattern layer may additionally include various patterns (e.g., a planar pattern or an input pattern) formed in a manner of being attached or printed. For example, the pattern layer may be formed through a UV molding. The pattern layer may be formed to express a metallic texture when external light is casted thereon. For example, the pattern of the pattern layer may express a hairline. The pattern layer is disposed inside the second cover 510-2, and the pattern of the pattern layer may be three-dimensionally seen through the transparent layer due to the thickness of the transparent layer.

The second cover 510-2 may further include a metal layer. The metal layer may be formed in a manner of depositing (e.g., physical vapor deposition (PVD) or chemical vapor deposition (CVD) or coating a metal (e.g., SnV, Al, Si, Ti, TiC, TiN, TiCB or $Al_2O_3$). The metal layer may express a metallic texture when external light is casted thereon. In addition, the metal layer is disposed inside the second cover 510-2, and may be three-dimensionally seen through the transparent layer due to the thickness of the transparent layer.

The second cover 510-2 may further include a light shield layer to shield light. The light shield layer may include a black component that does not reflect light but absorbs light. The light shield layer may be a layer printed in black. Alternatively, the light shield layer may be an adhesive containing a black component.

Figure 6:
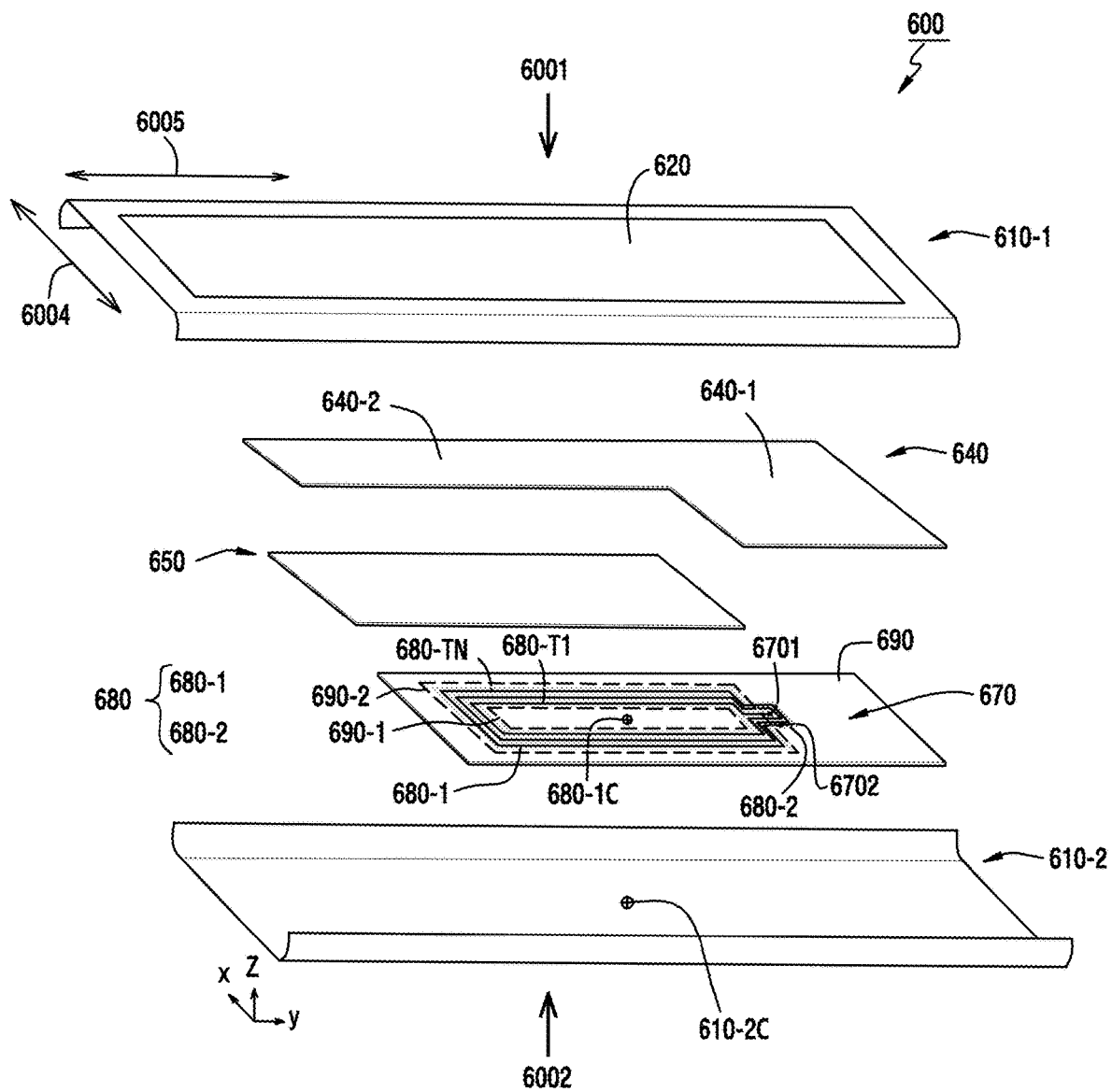
FIG. 6 is an exploded view with parts separated of an electronic device, according to an embodiment of the present disclosure.

FIG. 6 is an exploded view with parts separated of an electronic device 600, according to an embodiment of the present disclosure.

The electronic device 600 may be any one of the electronic device 102 of FIG. 1, the electronic device 201 of FIG. 2, the electronic device 300 of FIG. 3A, the electronic device 400 of FIG. 4, and the electronic device 500 of FIG. 5.

Referring to FIG. 6, the electronic device 600 may include a first housing 610-1, a second housing 610-2, a circuit board 640, a battery 650, and a conductive pattern 670.

The exterior of the electronic device 600 may include a first face 6001 facing a first direction and a second face 6002 facing a second direction that is opposite to the first direction. When the first housing 610-1 and the second housing 610-2 are coupled to each other, the first housing 610-1 may form the first face 6001, and the second housing 610-2 may form the second face 6002.

When the first housing 610-1 and the second housing 610-2 are coupled to each other, an exterior in the shape of a substantially rectangular plate may be formed. For example, the first face 6001 and the second face 6002 may have substantially generally rectangular shapes, including two short sides disposed opposite to each other and two long sides disposed opposite to each other.

The first housing 610-1 may include a display 620 that is exposed through a generally transparent first face 6001. The display 620 may include a conductive pattern for a touch input or a hovering input.

The circuit board 640 may be disposed between the first housing 610-1 and the conductive pattern 670. The circuit board 640 may include the circuit board 540 of FIG. 5.

The circuit board 640 may have a substantially "L" shape. For example, the circuit board 640 may include a first portion 640-1 extending in a direction 6004 from one long side to the other long side of the first face 6001. For example, the circuit board 640 may include a second portion 640-2 extending in a direction 6005 from one short side to the other short side of the first face 6001.

The battery 650 may be disposed between the first housing 610-1 and the conductive pattern 670. The battery 650 may be disposed in a space surrounded by the first portion 640-1 and the second portion 640-2 of the circuit board 650.

The conductive pattern 670 may be disposed between the battery 650 and the second housing 610-2.

The conductive pattern 670 may be formed through a sheet metal process for various metals such as copper, silver, stainless and etc.

The conductive pattern 670 may be formed through a laser direct structuring (LDS).

The conductive pattern 670 may be formed in the form of an indium tin oxide (ITO) film.

The conductive pattern 670 may be formed in the form of a flexible printed circuit board (FPCB).

The conductive pattern 670 may be coupled to the second housing 610-2. For example, the conductive pattern 670 may be molded in a manner similar to an in-molding antenna (IMA), or may be molded through dual injection molding. At least a portion of the conductive pattern 670 may be disposed in a manner of being inserted into the inside of an extruded product (e.g., the second housing 610-2) of the electronic device 600. At least a portion of the conductive pattern 670 is wrapped by an injection member, and thus can be protected (e.g., made dustproof or waterproof) from the outside. The rigidity of the extruded product (e.g., the second housing 610-2) can prevent deformation of at least a portion of the conductive pattern 670. The conductive pattern 670 may be formed through various other molding methods.

The conductive pattern 670 may include a conductive line extending from a first end 6701 to a second end 6702 to form a winding portion 680 of a plurality of turns.

The conductive pattern 670 may be a single layer, and may be disposed on a plane 690 between the first face 6001 and the second face 6002 of the electronic device 600. The plane 690 on which the conductive pattern is disposed may extend in substantially the same direction as the first face 6001 or the second face 6002.

When viewed from above the plane 690, the plane 690 may include an annular inner periphery 690-1 (or a first boundary) that is surrounded by at least a portion of the innermost turn 680-T1 of the plurality of turns, and an annular outer periphery 690-2 (or a second boundary) that surrounds at least a portion of the outermost turn 680-TN of the plurality of turns. The winding portion 680 may include a first winding portion 680-1 disposed between the first boundary 690-1 and the second boundary 690-2 of the plane 690 when viewed from above the plane 690. In addition, the winding portion 680 may include a second winding portion 680-2 disposed outside the second boundary 690-2 of the plane 690 when viewed from above the plane 690. The second winding portion 680-2 may include a first end 6701 and a second end 6702. Alternatively, although not illustrated, the second winding portion 680-2 including the first end 6701 and the second end 6702 may be disposed inside the first boundary 690-1 or between the first boundary 690-1 and the second boundary 690-2.

The first boundary 690-1 may have a substantially polygonal shape (e.g., a rectangular shape), and the second boundary 690-2 may have a substantially polygonal shape, of which the sides face the sides of the polygonal shape of the first boundary 690-1, respectively. Alternatively, the first boundary 690-1 and the second boundary 690-2 may have a substantially circular or elliptical shape.

The interval between the first boundary 690-1 and the second boundary 690-2 may or may not be constant.

When viewed from above the first surface 6001, the first winding portion 680-1 may include a plurality of lines arranged spirally from the center 680-1C as the starting point. The center 680-1C of the first winding portion 680-1 may be located inside the first boundary 690-1.

When viewed from above the first surface 6001, the center 680-1C of the first winding portion 680-1 may substantially coincide with the center 610-2C of the rectangular second housing 610-2.

When viewed from above the first face 6001, the winding portion 680 of the conductive pattern 670 may at least partially overlap with the battery 650.

The conductive pattern 670 may be electrically connected to the circuit board 640. For example, when the circuit board 640 and the conductive pattern 670 are coupled to each other, the conductive pattern 670 may be electrically connected to the circuit board 640. A first point for electrical connection to the circuit board 640 may be located on or near the first end 6701 of the conductive pattern 670. A second point for electrical connection to the circuit board 640 may be located on or near the second end 6702 of the conductive pattern 670. When the first point is located outside the first end 6701 of the conductive pattern 670, a line may be added that electrically connects the first end 6701 and the first point to each other. When the second point is located outside the second end 6702 of the conductive pattern 670, a line may be added that electrically connects the second end 6702 and the second point to each other.

The first point and the second point may be disposed on the plane on which the conductive pattern 670 is disposed.

When viewed from above the first face 6001, the first point and the second point of the conductive pattern 670 may not overlap with the battery 650.

The conductive pattern 670 may be electrically connected to a wireless charging circuit mounted on the circuit board 640. Alternatively, the conductive pattern 670 may be electrically connected to a communication circuit mounted on the circuit board 640.

The conductive pattern 670 may be used as an antenna for wireless charging. For example, at least one conductive pattern may be used as an antenna for resonant wireless charging. Or, at least one conductive pattern may be used as an antenna for inductive wireless charging.

The conductive pattern 670 may be used as an antenna for various types of communication. For example, at least one conductive pattern may be used for cellular communication, short range communication (e.g., WiFi, BT, NFC, or GNSS), transmission/reception of a magnetic signal (e.g., MST for electronic settlement), or the like.

Figure 7:
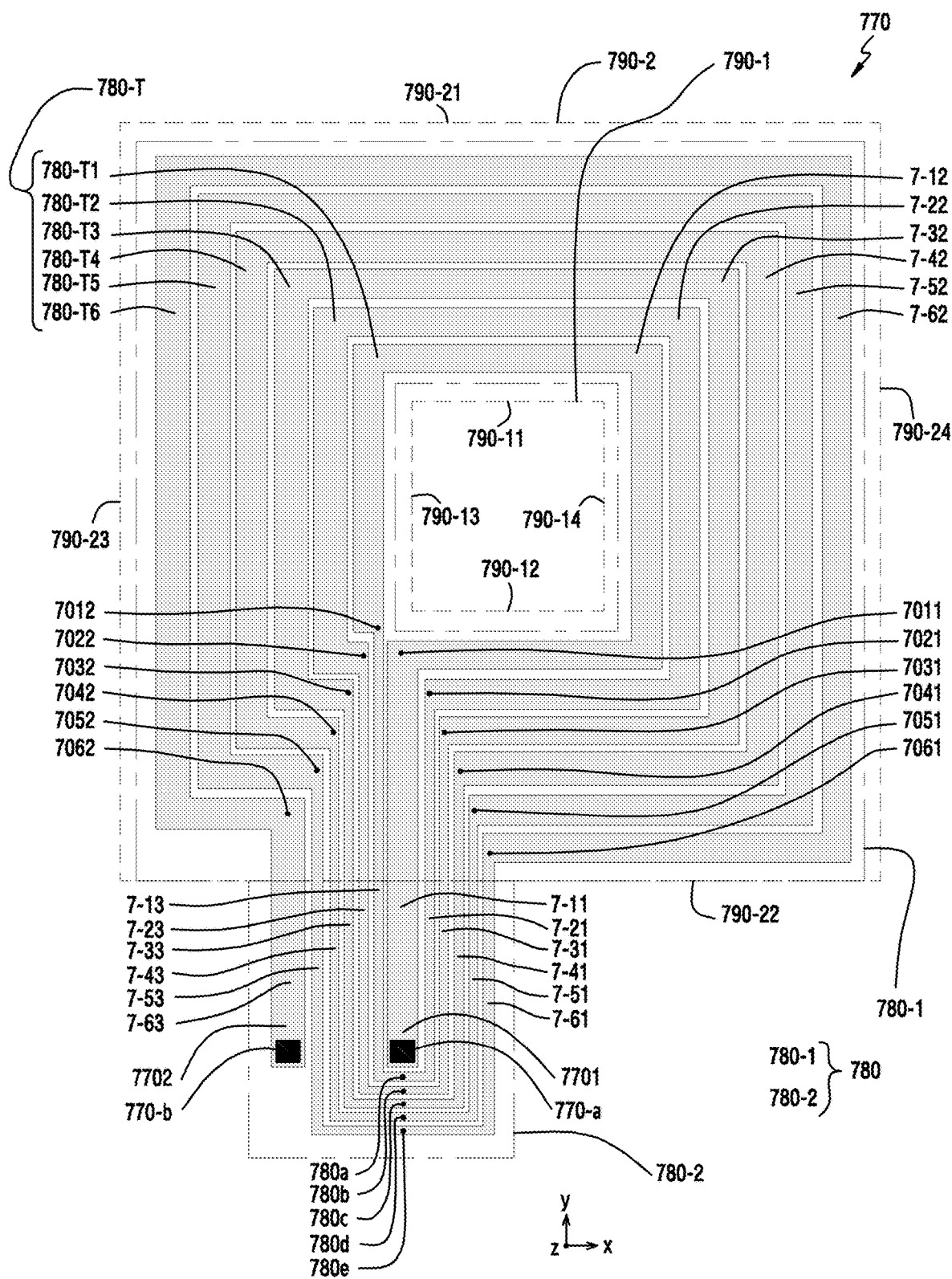
FIG. 7 is a diagram of a conductive pattern, according to an embodiment of the present disclosure.

FIG. 7 is a diagram of a conductive pattern, according to an embodiment of the present disclosure.

According to various embodiments, a conductive pattern 770 may include the conductive pattern 670 of FIG. 6.

Referring to FIG. 7, the conductive pattern 770 may include a conductive line extending from a first end 7701 to a second end 7702 to form a winding portion 780 of a plurality of turns 780-T. The conductive pattern 770 may include six (6) turns 780-T1, 780-T2, 780-T3, 780-T4, 780-T5, and 780-T6. Alternatively, the conductive pattern 770 may include less than six turns or more than six turns.

When viewed in a plan view, the conductive pattern 770 may include an annular inner periphery 790-1 (or a first boundary) that is surrounded by at least a portion of the innermost turn 780-T1 of the plurality of turns 780-T, and an annular outer periphery 790-2 (or a second boundary) that surrounds at least a portion of the outermost turn 780-T6 of the plurality of turns.

The first boundary 790-1 may have a substantially rectangular shape, and the second boundary 790-2 may have a substantially rectangular shape, of which the sides face the sides of the rectangular shape of the first boundary 790-1, respectively. For example, the first boundary 790-1 may include a $(1-1)^{th}$ side 790-11, a $(1-2)^{th}$ side 790-12, a $(1-3)^{th}$ side 790-13, and a $(1-4)^{th}$ side 790-14. The $(1-1)^{th}$ side 790-11 and the $(1-2)^{th}$ side 790-12 may be disposed opposite to each other, and the $(1-3)^{th}$ side 790-13 and the $(1-4)^{th}$ side 790-14 may be disposed opposite to each other. The $(1-3)^{th}$ side 790-13 may connect one end of the $(1-1)^{th}$ side 790-11 and one end of the $(1-2)^{th}$ side 790-12 to each other. The $(1-4)^{th}$ side 790-14 may connect the other end of the $(1-1)^{th}$ side 790-11 and the other end of the $(1-2)^{th}$ side 790-12 to each other. The second boundary 790-2 may include a $(2-1)^{th}$ side 790-21, a $(2-2)^{th}$ side 790-22, a $(2-3)^{th}$ side 790-23, and a $(2-4)^{th}$ side 790-24 that correspond to the $(1-1)^{th}$ side 790-11, the $(1-2)^{th}$ side 790-12, the $(1-3)^{th}$ side 790-13, and the $(1-4)^{th}$ side 790-14 of the first boundary 790-1, respectively.

The distance between the $(1-1)^{th}$ side 790-11 and the $(2-1)^{th}$ side 790-21, the distance between the $(1-2)^{th}$ side 790-12 and the $(2-2)^{th}$ side 790-22, the distance between the $(1-3)^{th}$ side 790-13 and the $(2-3)^{th}$ side 790-23, or the distance between the $(1-4)^{th}$ side 790-14 and the $(2-4)^{th}$ side 790-24 may or may not be constant.

The winding portion 780 may include the first winding portion 780-1 disposed between the first boundary 790-1 and the second boundary 790-2 when viewed in a plan view. The winding portion 780 may include the second winding portion 780-2 disposed outside the second boundary 790-2 when viewed in a plan view. Both the first end 7701 and the second end 7702 are included in the second winding portion 780-2, and may be located outside the second boundary 790-2.

For example, the first turn 780-T1 may include a $(1-1)^{th}$ extension 7-11 extending from the first end 7701 to a $(1-1)^{th}$ point 7011 between the first boundary 790-1 and the second boundary 790-2. The first turn 780-T1 may include a $(1-2)^{th}$ extension 7-12 extending from the $(1-1)^{th}$ point 7011 to a $(1-2)^{th}$ point 7012, turning counterclockwise along a gap between the first boundary 790-1 and the second boundary 790-2. The first turn 780-T1 may include a $(1-3)^{th}$ extension 7-13 extending from the $(1-2)^{th}$ point 7012 to a first turn point 780a near the first end 7701 in the outside of the first end 7701. The first turn point 780a may be located outside the second boundary 790-2.

For example, the second turn 780-T2 may include a $(2-1)^{th}$ extension 7-21 extending from the first turn point 780 to a $(2-1)^{th}$ point 7021 near the $(1-1)^{th}$ point 7011 in the outside of the $(1-1)^{th}$ point 7011. The second turn 780-T2 may include a $(2-2)^{th}$ extension 7-22 extending from the $(2-1)^{th}$ point 7021 to a $(2-2)^{th}$ point 7022 in the outside of the $(1-2)^{th}$ point 7012, turning counterclockwise along a gap between the first boundary 790-1 and the second boundary 790-2. The second turn 780-T2 may include a $(2-3)^{th}$ extension 7-23 extending from the $(2-2)^{th}$ point 7022 to a second turn point 780b near the first turn point 780a in the outside of the first turn point 780a.

For example, the third turn 780-T3 may include a $(3-1)^{th}$ extension 7-31 connecting the second turn point 780b and the $(3-1)^{th}$ point 7031, in the similar manner to the second turn 780-T2. The third turn 780-T3 may include a $(3-2)^{th}$ extension 7-32 connecting the $(3-1)^{th}$ point 7031 and the $(3-2)^{th}$ point 7032 to each other. The third turn 780-T3 may include a $(3-3)^{th}$ extension 7-33 connecting the $(3-2)^{th}$ point 7032 and the third turn point 780c to each other.

For example, the fourth turn 780-T4 may include a $(4-1)^{th}$ extension 7-41 connecting the third turn point 780c and the $(4-1)^{th}$ point 7041, in the similar manner to the third turn 780-T3. The fourth turn 780-T4 may include a $(4\text{-}2)^{th}$ extension 7-42 connecting the $(4\text{-}1)^{th}$ point 7041 and the $(4\text{-}2)^{th}$ point 7042 to each other. The fourth turn 780-T4 may include a $(4\text{-}3)^{th}$ extension 7-43 connecting the $(4\text{-}2)^{th}$ point 7042 and the fourth turn point 780d to each other.

For example, the fifth turn 780-T5 may include a $(5\text{-}1)^{th}$ extension 7-51 connecting the fourth turn point 780d and the $(5\text{-}1)^{th}$ point 7051, in the similar manner to the fourth turn 780-T4. The fifth turn 780-T5 may include a $(5\text{-}2)^{th}$ extension 7-52 connecting the $(5\text{-}1)^{th}$ point 7051 and the $(5\text{-}2)^{th}$ point 7052 to each other. The fifth turn 780-T5 may include a $(5\text{-}3)^{th}$ extension 7-53 connecting the $(5\text{-}2)^{th}$ point 7052 and the sixth turn point 780e to each other.

For example, the sixth turn 780-16 may include a $(6\text{-}1)^{th}$ extension 7-61 connecting the fifth turn point 780e and the $(6\text{-}1)^{th}$ point 7061, in the similar manner to the fifth turn 780-T5. The sixth turn 780-T6 may include a $(6\text{-}2)^{th}$ extension 7-62 connecting the $(6\text{-}1)^{th}$ point 7061 and the $(6\text{-}2)^{th}$ point 7062 to each other. The sixth turn 780-T6 may include a $(6\text{-}3)^{th}$ extension 7-63 connecting the $(6\text{-}2)^{th}$ point 7062 and the second end 7702 to each other.

The plurality of turns 780-T may include annular portions and protruding portions that protrude to the outside of the annular portions.

The annular portions may include a $(1\text{-}2)^{th}$ extension 7-12, a $(2\text{-}2)^{th}$ extension 7-22, a $(3\text{-}2)^{th}$ extension 7-32, a $(4\text{-}2)^{th}$ extension 7-42, a $(5\text{-}2)^{th}$ extension 7-52, or a $(6\text{-}2)^{th}$ extension 7-62.

The protruding portions may include a line including the $(1\text{-}3)^{th}$ extension 7-13 and the $(2\text{-}1)^{th}$ extension 7-21, a line including the $(2\text{-}3)^{th}$ extension 7-23, and the $(3\text{-}1)^{th}$ extension 7-31, a line including the $(3\text{-}3)^{th}$ extension 7-33 and the $(4\text{-}1)^{th}$ extension 7-41, a line including the $(4\text{-}3)^{th}$ extension 7-43 and the $(5\text{-}1)^{th}$ extension (7-51), or a line including the $(5\text{-}3)^{th}$ extension portion 7-53 and the $(6\text{-}1)^{th}$ extension 7-61. The protruding portions may have a substantially "U" shape.

Both the first end 7701 and the second end 7702 may be located outside the second boundary 79-2. The first end 7701 may be disposed inside the protruding portions. For example, the first end 7701 may be disposed between the $(1\text{-}3)^{th}$ extension 7-13 and the $(2\text{-}1)^{th}$ extension 7-21. The second end 7702 may be located close to the protruding portions and outside the protruding portions.

The $(1\text{-}1)^{th}$ extension 7-11, the $(2\text{-}1)^{th}$ extension 7-21, the $(3\text{-}1)^{th}$ extension 7-31, the $(4\text{-}1)^{th}$ extension 7-41, the $(5\text{-}1)^{th}$ extension 7-51, or the $(6\text{-}1)^{th}$ extension 7-61 may extend substantially linearly.

The width or thickness of the $(1\text{-}1)^{th}$ extension 7-11, the $(2\text{-}1)^{th}$ extension 7-21, the $(3\text{-}1)^{th}$ extension 7-31, the $(4\text{-}1)^{th}$ extension 7-41, the $(5\text{-}1)^{th}$ extension 7-51, or the $(6\text{-}1)^{th}$ extension 7-61 may or may not be substantially constant.

A gap between the $(1\text{-}1)^{th}$ extension 7-11 and the $(2\text{-}1)^{th}$ extension 7-21, a gap between the $(2\text{-}1)^{th}$ extension 7-21 and the $(3\text{-}1)^{th}$ extension 7-31, a gap between the $(3\text{-}1)^{th}$ extension 7-31 and the $(4\text{-}1)^{th}$ extension 7-41, a gap between the $(4\text{-}1)^{th}$ extension 7-41 and the $(5\text{-}1)^{th}$ extension 7-51, or a gap between the $(5\text{-}1)^{th}$ extension 7-51 and the $(6\text{-}1)^{th}$ extensions 7-61 may or may not be constant.

The $(1\text{-}2)^{th}$ extension 7-12, the $(2\text{-}2)^{th}$ extension 7-22, the $(3\text{-}2)^{th}$ extension 7-32, the $(4\text{-}2)^{th}$ extension 7-42, the $(5\text{-}2)^{th}$ extension 7-52, or the $(6\text{-}2)^{th}$ extension 7-62 may extend along the first boundary 790-1. For example, the $(1\text{-}2)^{th}$ extension 7-12, the $(2\text{-}2)^{th}$ extension 7-22, the $(3\text{-}2)^{th}$ extension 7-32, the $(4\text{-}2)^{th}$ extension 7-42, the $(5\text{-}2)^{th}$ extension 7-52, or the $(6\text{-}2)^{th}$ extension 7-62 may have a substantially "C" shape.

The width or thickness of the $(1\text{-}2)^{th}$ extension 7-12, the $(2\text{-}2)^{th}$ extension 7-22, the $(3\text{-}2)^{th}$ extension 7-32, the $(4\text{-}2)^{th}$ extension 7-42, the $(5\text{-}2)^{th}$ extension 7-52, or the $(6\text{-}2)^{th}$ extension 7-62 may or may not be substantially constant.

A gap between the $(1\text{-}2)^{th}$ extension 7-12 and the $(2\text{-}2)^{th}$ extension 7-22, a gap between the $(2\text{-}2)^{th}$ extension 7-22 and the $(3\text{-}2)^{th}$ extension 7-32, a gap between the $(3\text{-}2)^{th}$ extension 7-32 and the $(4\text{-}2)^{th}$ extension 7-42, a gap between the $(4\text{-}2)^{th}$ extension 7-42 and the $(5\text{-}2)^{th}$ extension 7-52, or a gap between the $(5\text{-}2)^{th}$ extension 7-52 and the $(6\text{-}2)^{th}$ extensions 7-62 may or may not be constant.

The $(1\text{-}3)^{th}$ extension 7-13, the $(2\text{-}3)^{th}$ extension 7-23, the $(3\text{-}3)^{th}$ extension 7-33, the $(4\text{-}3)^{th}$ extension 7-43, the $(5\text{-}3)^{th}$ extension 7-53, or the $(6\text{-}3)^{th}$ extension 7-63 may extend substantially linearly.

The width or thickness of the $(1\text{-}3)^{th}$ extension 7-13, the $(2\text{-}3)^{th}$ extension 7-23, the $(3\text{-}3)^{th}$ extension 7-33, the $(4\text{-}3)^{th}$ extension 7-43, the $(5\text{-}3)^{th}$ extension 7-53, or the $(6\text{-}3)^{th}$ extension 7-63 may or may not be substantially constant.

A gap between the $(1\text{-}3)^{th}$ extension 7-13 and the $(2\text{-}3)^{th}$ extension 7-23, a gap between the $(2\text{-}3)^{th}$ extension 7-23 and the $(3\text{-}3)^{th}$ extension 7-33, a gap between the $(3\text{-}3)^{th}$ extension 7-33 and the $(4\text{-}3)^{th}$ extension 7-43, a gap between the $(4\text{-}3)^{th}$ extension 7-43 and the $(5\text{-}1)^{th}$ extension 7-53, or a gap between the $(5\text{-}3)^{th}$ extension 7-53 and the $(6\text{-}3)^{th}$ extensions 7-63 may or may not be constant.

The conductive pattern 780 may include a first contact 770-a and a second contact 770-b used to be electrically connected to a circuit board (e.g., the circuit board 640 in FIG. 6) of the electronic device. For example, the first contact 770-a may be disposed on the first end 7701, and the second contact 770-b may be disposed on the second end 7702.

Figure 8:
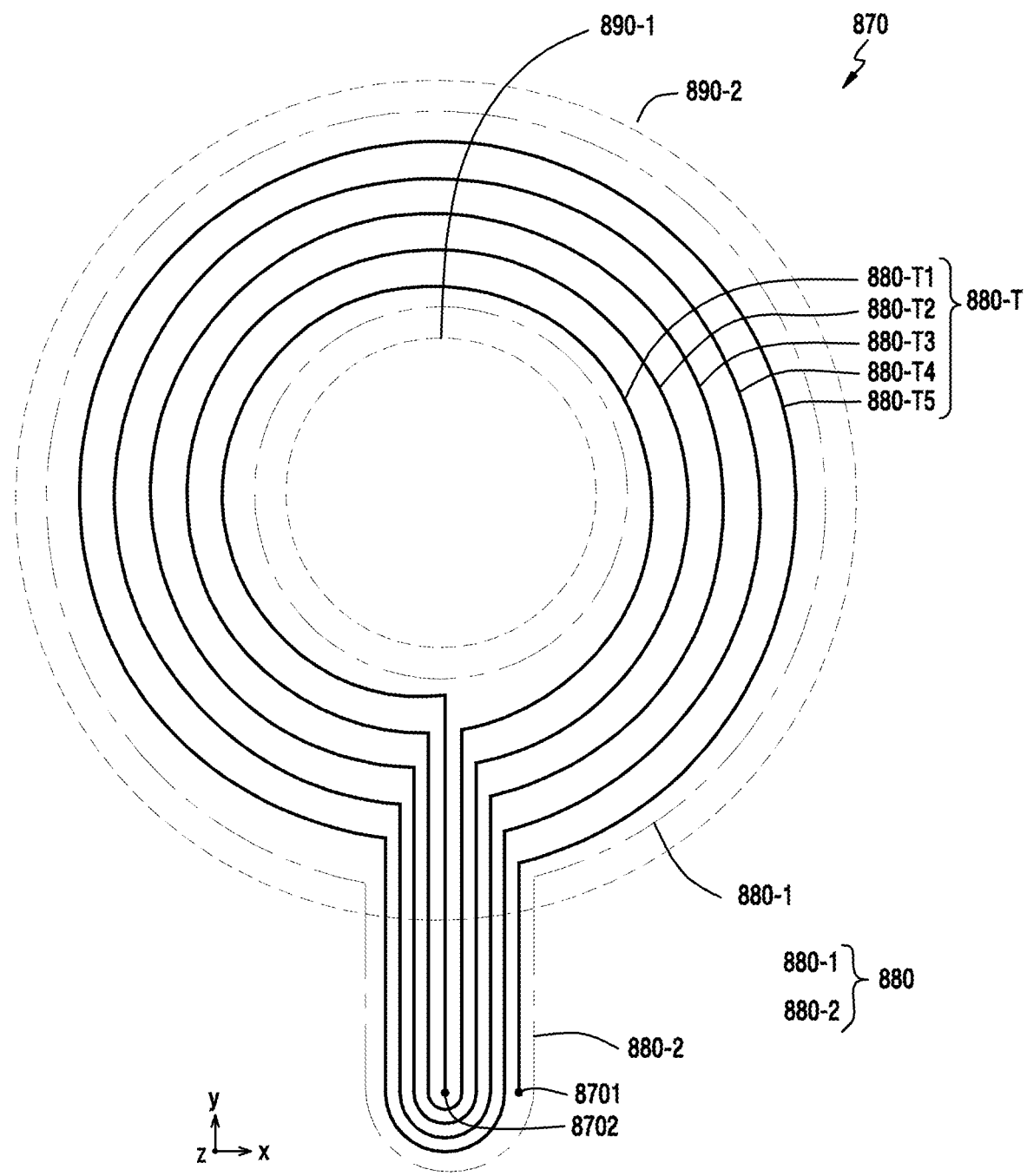
FIG. 8 is a diagram of a conductive pattern, according to an embodiment of the present disclosure.

FIG. 8 is a diagram of a conductive pattern, according to an embodiment of the present disclosure.

Referring to FIG. 8, the conductive pattern 870 may include a conductive line extending from a first end 8701 to a second end 8702 to form a winding portion 880 of a plurality of turns 880-T.

When viewed in a plan view, the conductive pattern 870 may include an annular inner periphery 890-1 (or a first boundary) that is surrounded by at least a portion of the innermost turn 880-T1 of the plurality of turns 880-T, and an annular outer periphery 890-2 (or a second boundary) that surrounds at least a portion of the outermost turn 880-T5 of the plurality of turns 880-T.

The first boundary 890-1 may have a substantially circular or oval shape, and the second boundary 890-2 may have a substantially circular or oval shape that surrounds the first boundary 890-1. The distance between the first boundary 890-1 and the second boundary 890-2 may or may not be constant.

The winding portion 880 may include a first winding portion 880-1 disposed between the first boundary 890-1 and the second boundary 890-2 when viewed in a plan view. The winding portion 880 may include a second winding portion 880-2 disposed outside the second boundary 890-2 when viewed in a plan view. Both the first end 8701 and the second end 8702 are included in the second winding portion 880-2, and may be located outside the second boundary 890-2.

Figure 9:
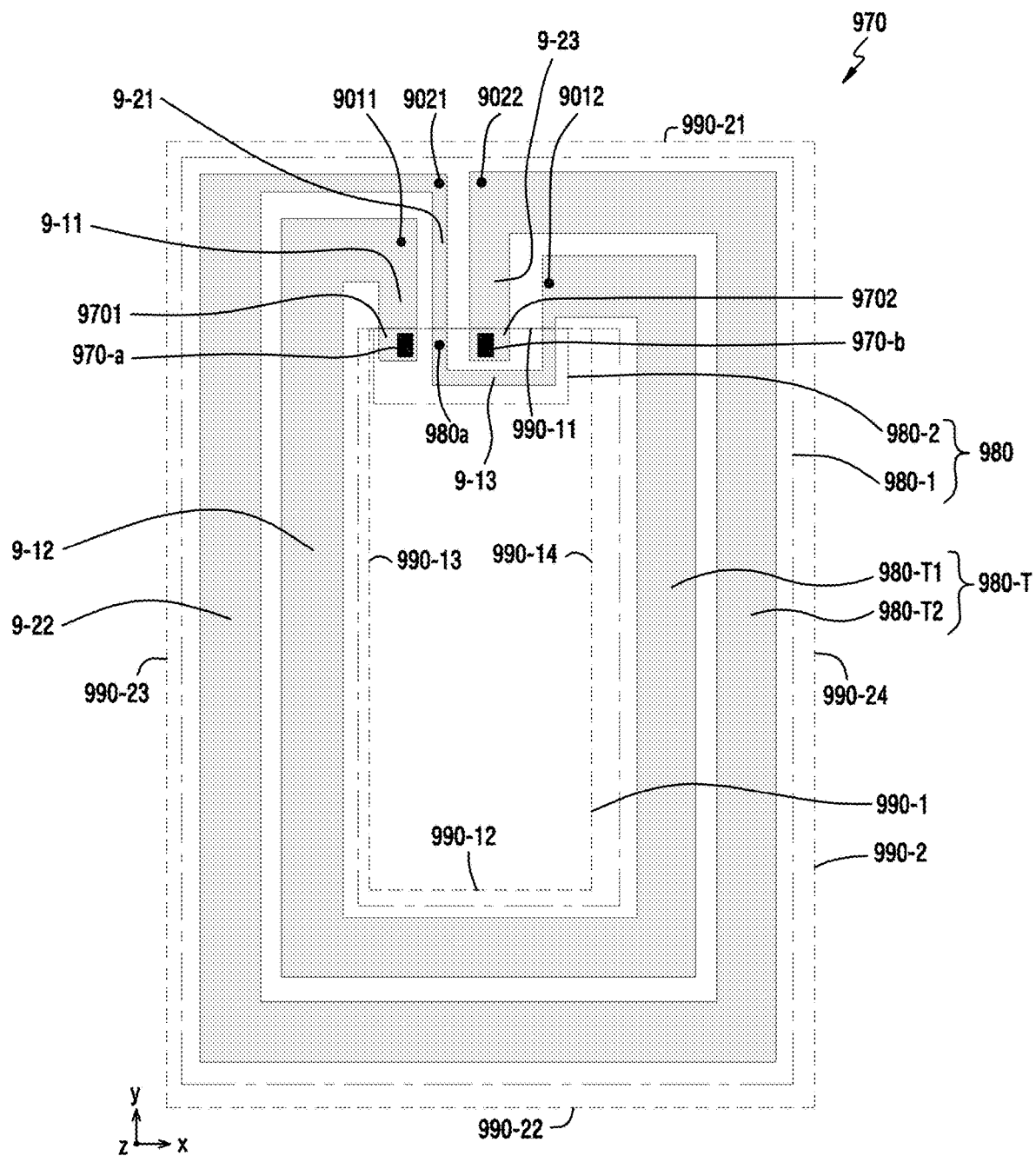
FIG. 9 is a diagram of a conductive pattern, according to an embodiment of the present disclosure.

FIG. 9 is a diagram of a conductive pattern, according to an embodiment of the present disclosure.

Referring to FIG. 9, a conductive pattern 970 may include a conductive line extending from a first end 9701 to a second end 9702 to form a winding portion 980 of a plurality of turns 980-T. The conductive pattern 970 may include two (2)

turns 980-T1 and 980-T2. Alternatively, although not illustrated, the conductive pattern 970 may include more than two turns.

When viewed in a plan view, the conductive pattern 970 may include an annular inner periphery 990-1 (or a first boundary) that is surrounded by at least a portion of the innermost turn 980-T1 of the plurality of turns 980-T, and an annular outer periphery 990-2 (or a second boundary) that surrounds at least a portion of the outermost turn 980-T2 of the plurality of turns 980-T.

The first boundary 990-1 may have a substantially rectangular shape, and the second boundary 990-2 may have a substantially rectangular shape, of which the sides face the sides of the rectangular shape of the first boundary 990-1, respectively. For example, the first boundary 990-1 may include a $(1-1)^{th}$ side 990-11, a $(1-2)^{th}$ side 990-12, a $(1-3)^{th}$ side 990-13, and a $(1-4)^{th}$ side 990-14. The $(1-1)^{th}$ side 990-11 and the $(1-2)^{th}$ side 990-12 may be disposed opposite to each other, and the $(1-3)^{th}$ side 990-13 and the $(1-4)^{th}$ side 990-14 may be disposed opposite to each other. The $(1-3)^{th}$ side 990-13 may connect one end of the $(1-1)^{th}$ side 990-11 and one end of the $(1-2)^{th}$ side 990-12 to each other. The $(1-4)^{th}$ side 990-14 may connect the other end of the $(1-1)^{th}$ side 990-11 and the other end of the $(1-2)^{th}$ side 990-12 to each other. The second boundary 990-2 may include a $(2-1)^{th}$ side 990-21, a $(2-2)^{th}$ side 990-22, a $(2-3)^{th}$ side 990-23, and a $(2-4)^{th}$ side 990-24 that correspond to the $(1-1)^{th}$ side 990-11, the $(1-2)^{th}$ side 990-12, the $(1-3)^{th}$ side 990-13, and the $(1-4)^{th}$ side 990-14 of the first boundary 990-1, respectively.

The distance between the $(1-1)^{th}$ side 990-11 and the $(2-1)^{th}$ side 990-21, the distance between the $(1-2)^{th}$ side 990-12 and the $(2-2)^{th}$ side 990-22, the distance between the $(1-3)^{th}$ side 990-13 and the $(2-3)^{th}$ side 990-23, or the distance between the $(1-4)^{th}$ side 990-14 and the $(2-4)^{th}$ side 990-24 may or may not be constant.

The winding portion 980 may include a first winding portion 980-1 disposed between the first boundary 990-1 and the second boundary 990-2 when viewed in a plan view. The winding portion 980 may include a second winding portion 980-2 disposed inside the first boundary 990-1 when viewed in a plan view. Both the first end 9701 and the second end 9702 are included in the second winding portion 980-2, and may be located inside the first boundary 990-1.

For example, the first turn 980-T1 may include a $(1-1)^{th}$ extension 9-11 extending from the first end 9701 to the $(1-1)^{th}$ point 9011 between the first boundary 990-1 and the second boundary 990-2, and a $(1-2)^{th}$ extension extending from the $(1-1)^{th}$ point 9011 to the $(1-2)^{th}$ point 9012, turning clockwise along the gap between the first boundary 990-1 and the second boundary 990-2. The $(1-2)^{th}$ point 9012 may be disposed between the first boundary 990-1 and the second boundary 990-2. The first turn 980-T1 may include a $(1-3)^{th}$ extension 9-13 extending from the $(1-2)^{th}$ point 9012 to the turn point 980a near the first end 9701 in the outside of the first end 9701. The turn point 980a may be disposed between the first end 9701 and the second end 9702 inside the first boundary 990-1. The second end 9702 may be disposed between the $(1-2)^{th}$ point 9012 and the turn point 980a.

For example, the second turn 980-T2 may include a $(2-1)^{th}$ extension 9-21 extending from the turn point 980a to the $(2-1)^{th}$ point 9021 between the first boundary 990-1 and the second boundary 990-2, and a $(2-2)^{th}$ extension 9-12 extending from the $(2-1)^{th}$ point 9021 to the $(2-2)^{th}$ point 9022. The $(2-2)^{th}$ point 9022 may be disposed between the first boundary 990-1 and the second boundary 990-2. The second turn 980-T2 may include a $(2-3)^{th}$ extension 9-23 extending from the $(2-2)^{th}$ point 9022 and the second end 9702.

The plurality of turns 980-T may include annular portions and protruding portions that protrude to the inside of the annular portions.

The annular portions may include a $(1-2)^{th}$ extension 9-12 and a $(2-2)^{th}$ extension 9-22. The protruding portions may include a $(2-1)^{th}$ extension 9-21 and a $(1-3)^{th}$ extension 9-13. The protruding portions may have a substantially "U" shape.

Both the first end 9701 and the second end 9702 may be located inside the first boundary 990-1. The first end 9701 may be disposed inside the protruding portions. For example, the first end 9701 may be disposed between the $(2-1)^{th}$ extension 9-21 and the $(1-3)^{th}$ extension 9-13. The second end 9702 may be located close to the protruding portions and outside the protruding portions.

The $(1-1)^{th}$ extension 9-11, the $(2-1)^{th}$ extension 9-21, or the $(2-3)^{th}$ extension 9-23 may extend substantially linearly.

The $(1-2)^{th}$ extension 9-12 and the $(2-2)^{th}$ extension 9-22 may have a substantially "C" shape extending between the first boundary 990-1 and the second boundary 990-2.

The $(1-3)^{th}$ extension 9-13 may have a substantially "U" shape that extends from the $(1-2)^{th}$ point 9012 to the turn point 980a, turning to the outside near the second end 9702.

Figure 10:
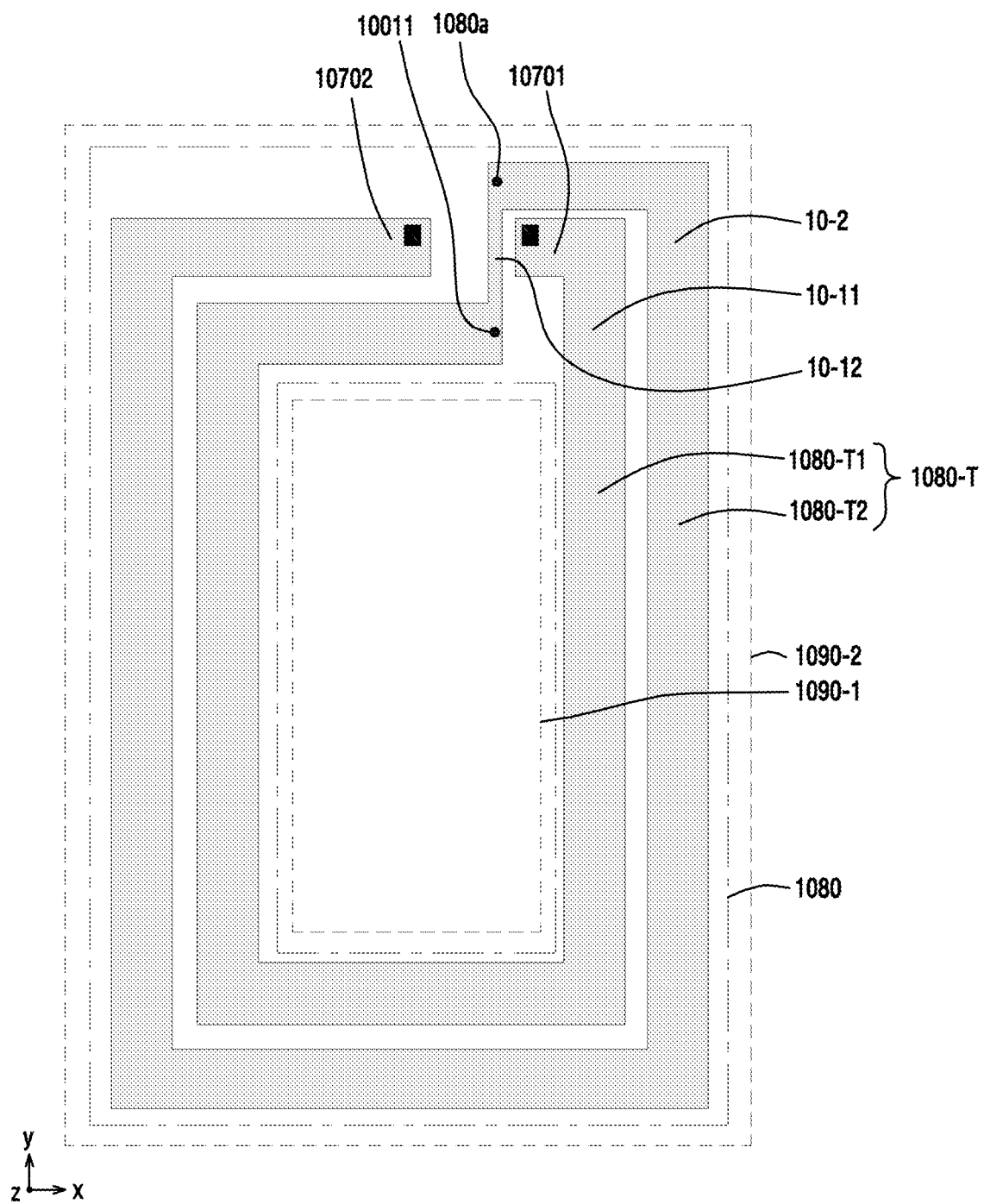
FIG. 10 is a diagram of a conductive pattern, according to an embodiment of the present disclosure.

FIG. 10 is a diagram of a conductive pattern, according to an embodiment of the present disclosure.

Referring to FIG. 10, the conductive pattern 1070 may include a conductive line extending from a first end 10701 to a second end 10702 to form a winding portion 1080 of a plurality of turns 1080-T. The conductive pattern 1070 may include two (2) turns 1080-T1 and 1080-T2. Alternatively, although not illustrated, the conductive pattern 1070 may include more than two turns.

When viewed in a plan view, the conductive pattern 1070 may include an annular inner periphery 1090-1 (or a first boundary) that is surrounded by at least a portion of the innermost turn 1080-T1 of the plurality of turns 1080-1, and an annular outer periphery 1090-2 (or a second boundary) that surrounds at least a portion of the outermost turn 1080-T2 of the plurality of turns 1080-T.

The first boundary 1090-1 may have a substantially rectangular shape, and the second boundary 1090-2 may have a substantially rectangular shape, of which the sides face the sides of the rectangular shape of the first boundary 1090-1, respectively.

The binding portion 1080 may be disposed between the first boundary 1090-1 and the second boundary 1090-2 when viewed in a plan view. Both the first end 10701 and the second end 10702 may be positioned between the first boundary 1090-1 and the second boundary 1090-2.

For example, the first turn 1080-T1 may include a $(1-1)^{th}$ extension 10-11 extending from the first end 10701 to the $(1-1)^{th}$ point 10011, and a $(1-2)^{th}$ extension 10-12 extending from the $(1-1)^{th}$ point 10011 to a turn point 1080a adjacent to the second end 10702 in the outside of the second end 10702. The turn point 1080a may be disposed between the first end 10701 and the second end 10702.

For example, the second turn 1080-T2 may include a second extension 10-2 extending from the turn point 1080a to the second end 10702.

The $(1-1)^{th}$ extension 10-11 may have a substantially "C" shape extending along the gap between the first boundary 1090-1 and the second boundary 1090-2. Alternatively, the $(1-1)^{th}$ point 10011 of the $(1-1)^{th}$ extension 10-11 may be disposed closer to the first boundary 1090-1 than the first end 10701.

The second extension 10-2 may have a substantially "C" shape extending along the gap between the first boundary 1090-1 and the second boundary 1090-2. Alternatively, the turn point 1080a of the second extension 10-2 may be disposed closer to the second boundary 1090-2 than the second end 10702.

Both the first end 10701 and the second end 10702 may be disposed between the first boundary 1090-1 and the second boundary 1090-2. The conductive line may include a portion extending outwardly from the first boundary 1090-1 (e.g., the $(1-2)^{th}$ extension 10-12). The $(1-2)^{th}$ extension 10-12 may be disposed between the first boundary 10701 and the second boundary 10702, and may extend substantially linearly.

Figure 11:
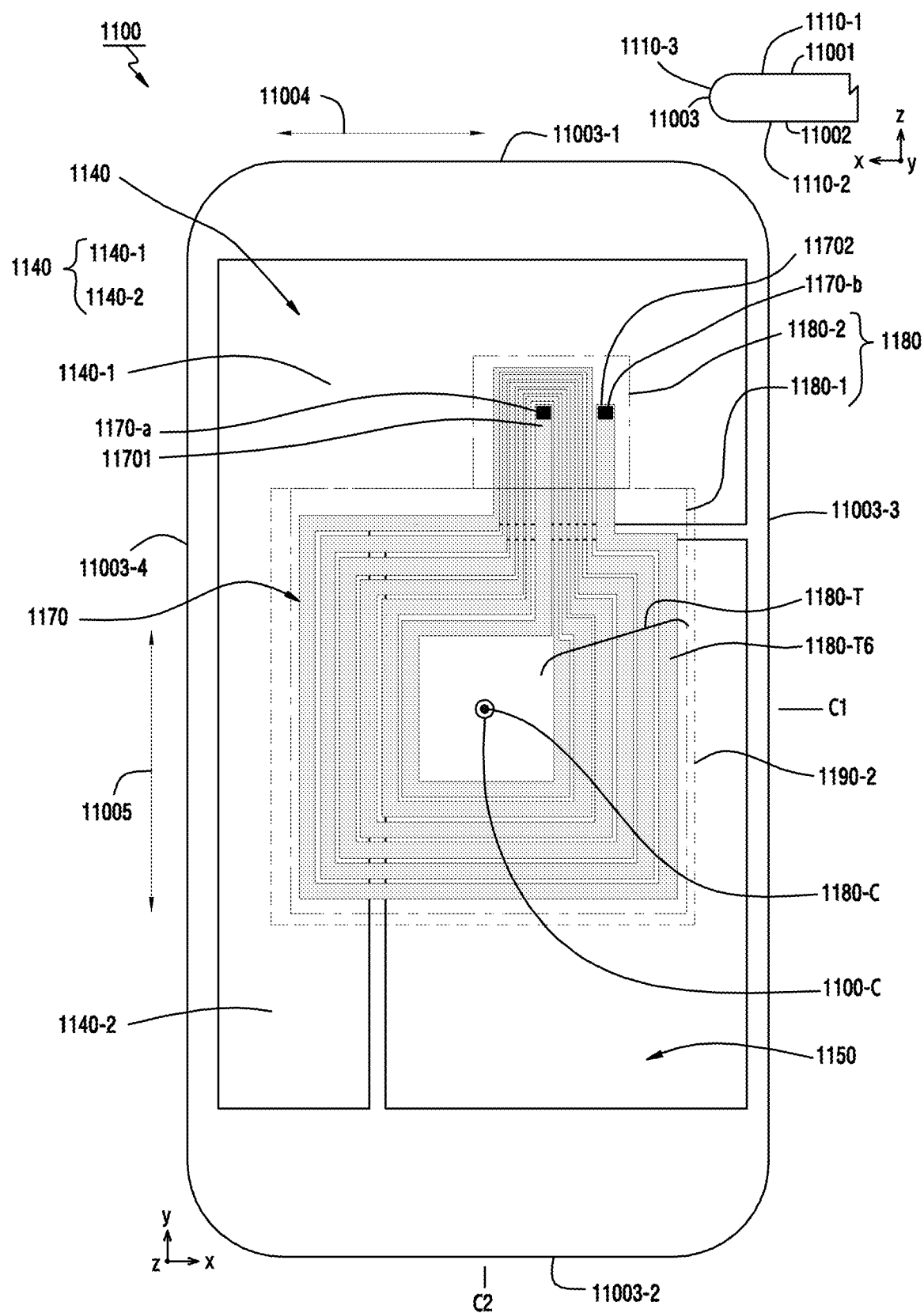
FIG. 11 is a diagram of a conductive pattern, according to an embodiment of the present disclosure.

FIG. 11 is a diagram of a state in which a second cover is separated from an electronic device 1100, according to an embodiment of the present disclosure.

The electronic device 1100 may be any one of the electronic device 102 of FIG. 1, the electronic device 201 of FIG. 2, the electronic device 300 of FIG. 3A, the electronic device 400 of FIG. 4, the electronic device 500 of FIG. 5, and the electronic device 600 of FIG. 6.

The electronic device 1100 may include a first cover 1110-1 forming the first face 11001 that faces the first direction, and a second cover 1110-2 forming the second face 11002 that faces the second direction that is opposite to the first direction. The electronic device 1100 may include a bezel 1110-3 (e.g., the bezel 310-3 of FIG. 3A) forming a third face 11003 that surrounds the space between the first face 11001 and the second face 11002.

As viewed from above the second face 11002, the third face 11003 may include a $(3-1)^{th}$ face 11003-1, a $(3-2)^{th}$ face 11003-2, a $(3-3)^{th}$ surface 11003-3, and a $(3-4)^{th}$ face 11003-4. The $(3-1)^{th}$ face 11003-1 and the $(3-2)^{th}$ face 11003-2 may be disposed opposite to each other, and the $(3-3)^{th}$ face 11003-3 and the $(3-4)^{th}$ face 11003-4 may be disposed opposite to each other. The $(3-3)^{th}$ face 11003-3 may connect one end of the $(3-1)^{th}$ face 11003-1 and one end of the $(3-2)^{th}$ face 11003-2 to each other. The fourth face 11003-4 may connect the other end of the $(3-1)^{th}$ face 11003-1 and the other end of the $(3-2)^{th}$ face 11003-2 to each other.

Referring to FIG. 11, when viewed from above the second face 11002, the electronic device 1100 may include a circuit board 1140, a battery 1150, and a conductive pattern 1170.

When viewed from above the second face 11002, the circuit board 1140 may include a first portion 1140-1 extending in a direction 11004 from the $(3-3)^{th}$ face 11003-3 toward the $(3-4)^{th}$ face 11003-4, and a second portion 1140-2 extending in a direction 11005 from the $(3-1)^{th}$ face 11003-1 toward the $(3-2)^{th}$ face 11003-2. For example, the circuit board 1140 may have a substantially "L" shape.

When viewed from above the second face 11002, the first portion 1140-1 of the circuit board 1140 may be disposed between the $(3-1)^{th}$ face 11003-1 and the battery 1150. The second portion 1140-2 of the circuit board 1140 may be disposed between the $(3-4)^{th}$ face 11003-4 and the battery 1150.

When viewed from above the second face 11002, the battery 1150 may be disposed between the second portion 1140-2 of the circuit board 1140 and the $(3-3)^{th}$ face 11003-3.

When viewed from above the second face 11002, a conductive pattern 1170 may include a conductive line extending from a first end 11701 to a second end 11702 to include a plurality of turns 1180-T.

The conductive pattern 1170 may be the conductive pattern 770 of FIG. 7. For example, as viewed from above the second face 11002, the conductive pattern 1170 may include an annular second boundary 1190-2 that surrounds at least a portion of the outermost turn 1180-T6 of the plurality of turns 1180-T. The conductive pattern 1170 may include a first winding portion 1180-1 disposed inside the second boundary 1190-2 and a second winding portion 1180-2 disposed outside the second boundary 1190-2. Both the first end 11701 and the second end 11702 may be included in the second winding portion 1180-2, and may be located outside the second boundary 1190-2.

The conductive pattern 1170 may include a first contact 1170a disposed on the first end 11701 and a second contact 1170b disposed on the second end 11702. The first contact 1170a and the second contact 1170b may be electrically connected to the circuit board 1040. The first contact 1170a may be disposed around the vicinity of the first end 11701, and the second contact 1170b may be disposed around the vicinity of the second end 11702.

When viewed from above the second surface 11002, the first winding portion 1180-1 may include a plurality of lines arranged spirally from the center 1180-C as the starting point.

When viewed from above the second surface 11002, the center 1180-C of the first winding portion 1180-1 may substantially coincide with the center 1100-C of the electronic device 1100. The center 1100-C of the electronic device 1100 may be an intersection of the center line C1 between the $(1-3)^{th}$ face 11003-1 and the $(3-2)^{th}$ face 11003-2 and the center line C2 between the $(3-3)^{th}$ face 11003-3 and the $(3-4)^{th}$ face 11003-4. The lines of the first winding portion 1180-1 may be arranged spirally from the center 1100-C of the electronic device 1100 as the starting point.

When viewed from above the second face 11002, the winding portion 1180 of the conductive pattern 1170 may at least partially overlap with the circuit board 1140 and/or the battery 1150.

When viewed from above the second face 11002, the first end 11701 and the second end 11702 of the conductive pattern 1170 may not overlap with the battery 1150.

The first end 11701 and the second end 11702 may be arranged side by side in the direction from the $(3-4)^{th}$ face 11003-4 toward the $(3-3)^{th}$ face 11003-3.

Figure 12:
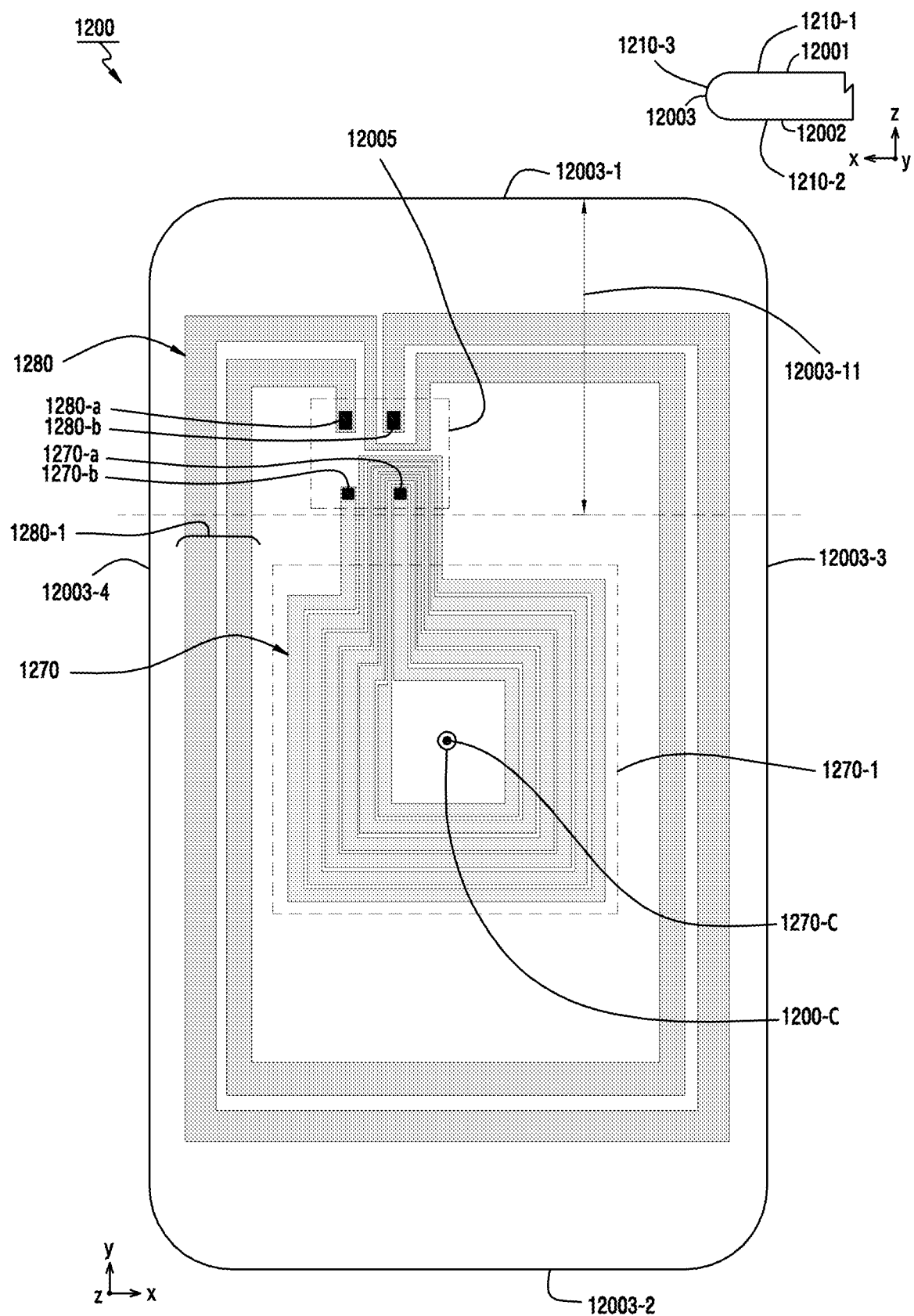
FIG. 12 is a diagram of a conductive pattern, according to an embodiment of the present disclosure.

FIG. 12 is a diagram of a state in which a second cover is separated from an electronic device 1200, according to one embodiment of the present disclosure.

According to various embodiments, an electronic device 1200 may be any one of the electronic device 102 of FIG. 1, the electronic device 201 of FIG. 2, the electronic device 300 of FIG. 3A, the electronic device 400 of FIG. 4, the electronic device 500 of FIG. 5, and the electronic device 600 of FIG. 6.

The electronic device 1200 may include a first cover 1210-1 forming the first face 12001 that faces the first direction, and a second cover 1210-2 forming the second face 12002 that faces the second direction that is opposite to the first direction. The electronic device 1200 may include a bezel 1210-3 (e.g., the bezel 310-3 of FIG. 3A) forming a third face 12003 that surrounds the space between the first face 12001 and the second face 12002.

The electronic device 1200 may include a circuit board (e.g., the circuit board 1140 of FIG. 11) and a battery (e.g., the battery 1150 of FIG. 11.

When viewed from above the second face 12002, the electronic device 1200 may include a first conductive pattern 1270 and a second conductive pattern 1280. The first conductive pattern 1270 may be similar or identical to the conductive pattern 770 of FIG. 7, and a detailed description thereof will be omitted. The second conductive pattern 1280 may be similar or identical to the conductive pattern 970 of FIG. 9, and a detailed description thereof will be omitted.

When viewed from above the second face 12002, the first conductive pattern 1270 may be surrounded by the second conductive pattern 1280.

When viewed from above the second surface 12002, the first winding portion 1270-1 of the first conductive pattern 1270 (e.g., the first winding portion 780-1 of FIG. 7) may include a plurality of lines arranged spirally from the center 1270-C as the starting point. When viewed from above the second face 12002, the center 1270-C may substantially coincide with the center 1200-C of the electronic device 1200 (e.g., the center 1100-c of FIG. 11). The lines of the first winding portion 1270-1 of the first conductive pattern 1270 may be arranged spirally from the center 1200-C of the electronic device 1200 as the starting point.

When viewed from above the second surface 12002, the first winding portion 1280-1 of the second conductive pattern 1280 (e.g., the first winding portion 980-1 of FIG. 9) may include a plurality of lines arranged spirally from the center 1270-C as the starting point.

The first conductive pattern 1270 and the second conductive pattern 1280 may be disposed together on a plane between the first face 12001 and the second face 12002 of the electronic device 1200. For example, the first conductive pattern 1270 and the second conductive pattern 1280 may be disposed on a plane that is disposed to be parallel to the first face 12001 or the second face 12002. Alternatively, the first conductive pattern 1270 and the second conductive pattern 1280 may be coupled to the second cover 1210-2, or may be included in the second cover 1210-2.

When viewed from the above of the second face 12002, the contacts (first contact 1270-*a* and second contact 1270-*b*) of the first conductive pattern 1270 may be disposed adjacent to the contacts (the first contact 1280-*a* and the second contact 1280-*b*) of the second conductive pattern 1280. For example, the contacts 1270-*a* and 1270-*b* of the first conductive pattern 1270 and the contacts 1280-*a* and 1280-*b* of the second conductive pattern 1280 may be disposed within a pre-designed region 12005 of the plane. The pre-designed region 12005 may correspond to a region where the contacts of a circuit board (e.g., the circuit board 640 of FIG. 6) are arranged.

When viewed from above the second face 12002, the contacts 1270-*a* and 1270-*b* of the first conductive pattern 1270 and the contacts 1280-*a* and 1280-*b* of the second conductive pattern 1280 may be disposed between the third face 12003 of the electronic device 1200 and the center 1200-C of the electronic device 1200. For example, the contacts 1270-*a* and 1270-*b* of the first conductive pattern 1270 and the contacts 1280-*a* and 1280-*b* of the second conductive pattern 1280 may be disposed closer to the $(3-1)^{th}$ face 12003-1 (e.g., the $(1-3)^{th}$ face 11003-1 of FIG. 11) than the center 1200-C of the electronic device 1200.

The contacts 1270-*a* and 1270-*b* of the first conductive pattern 1270 may be electrically connected to a circuit board (e.g., the circuit board 640 of FIG. 6). The contacts 1280-*a* and 1280-*b* of the second conductive pattern 1280 may be electrically connected to a circuit board.

The circuit board may include an electronic circuit for various types of functions. For example, the circuit board may include a wireless charging circuit that supports various types of wireless charging using at least a portion of the first conductive pattern 1270 and/or the second conductive pattern 1280. Alternatively, the circuit board may include a communication circuit that supports various types of communication using at least a portion of the first conductive pattern 1270 and/or the second conductive pattern 1280.

Both the first conductive pattern 1270 and the second conductive pattern 1280 may be used as an antenna for wireless charging. For example, the first conductive pattern 1270 and the second conductive pattern 1280 may support different types of wireless charging, respectively. The first conductive pattern 1270 may be used as an antenna for wireless charging. Also, the second conductive pattern 1280 may be used as an antenna for resonant wireless charging. In another example, the first conductive pattern 1270 and the second conductive pattern 1280 may support the same types of wireless charging, respectively.

At least a portion of the first conductive pattern 1270 and the second conductive pattern 1280 may be used as an antenna for various types of communication. For example, at least a portion of the first conductive pattern 1270 and the second conductive pattern 1280 may support a short range communication (e.g., NFC or MST transmission/reception).

The first conductive pattern 1270 may be used as an antenna for wireless charging and the second conductive pattern 1280 may be used as an antenna for various types of communication. Alternatively, the first conductive pattern 1270 may be used as an antenna for various types of communication and the second conductive pattern 1280 may be used as an antenna for wireless charging.

A control circuit (e.g., the processor 210 of FIG. 2) of a circuit board (e.g., the circuit board 640 of FIG. 6) may selectively use (or activate) the first conductive pattern 1270 and/or the second conductive pattern 1280. For example, the control circuit may be adjusted to selectively connect the first conductive pattern 1270 to a wireless charging circuit or a communication circuit depending on various types of inputs (e.g., a user input, a sensor input, and a wireless input). Alternatively, the control circuit may be adjusted to selectively connect the second conductive pattern 1280 to a wireless charging circuit or a communication circuit depending on various types of inputs.

When it is sensed, through various inputs (e.g., sensor inputs, etc.), that the electronic device 1200 is mounted on the inductive external charging device, or the inductive wireless charging function is activated, the control circuit may electrically connect the first conductive pattern 1270 to the wireless charging circuit and may not electrically connect the second conductive pattern 1280 to the wireless charging circuit. Alternatively, when it is sensed, through various inputs, that the electronic device 1200 is mounted on the inductive external charging device, or the resonant wireless charging function is activated, the control circuit may electrically connect the second conductive pattern 1280 to the wireless charging circuit and may not electrically connect the first conductive pattern 1270 to the wireless charging circuit.

When the first communication is set as activated, the control circuit may electrically connect the first conductive pattern 1270 to the communication circuit and may not electrically connect the second conductive pattern 1280 to the communication circuit. Alternatively, when the second communication is set as activated, the control circuit may electrically connect the second conductive pattern 1280 to the communication circuit and may not electrically connect the first conductive pattern 1270 to the communication circuit.

The control circuit may electrically connect both the first conductive pattern 1270 and the second conductive pattern 1280 to the communication circuit so that the communication can be adjusted. For example, when the electronic device 1200 is affected by the user's body, or when deterioration of an antenna performance (e.g., reduction of signal strength) occurs, the control circuit may electrically connect the first conductive pattern 1270 or the second conductive pattern 1280 to the communication circuit so as to facilitate communication.

The control circuit may selectively adjust the first conductive pattern 1270 or the second conductive pattern 1280 to an electrical floating state. For example, when the electronic device 1200 is affected by the user's body, or when deterioration of the antenna performance occurs, the control circuit may adjust the first conductive pattern 1270 or the second conductive pattern 1280 to an electrical floating state so as to facilitate communication.

Figure 13:
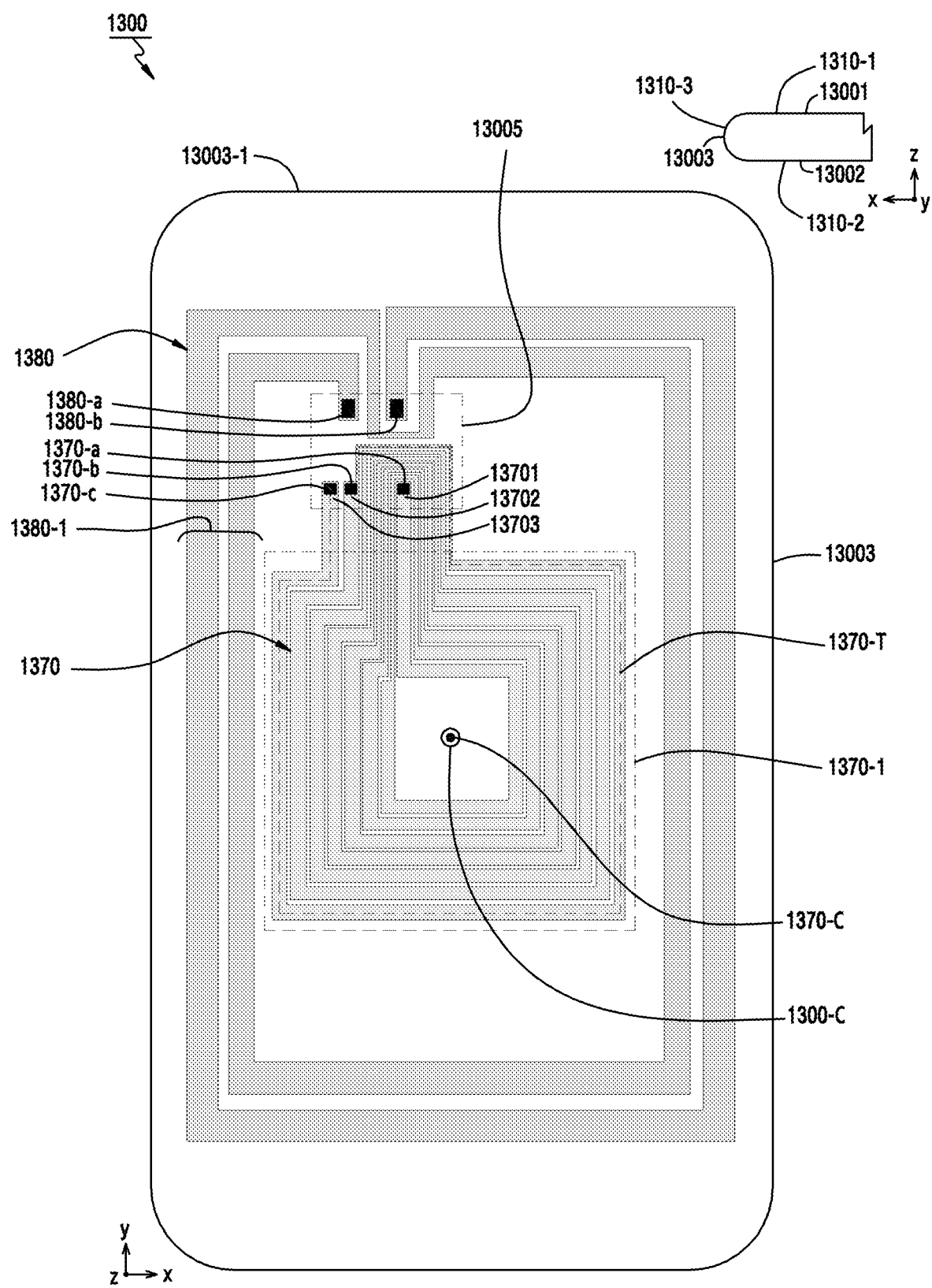
FIG. 13 is a diagram of a conductive pattern, according to an embodiment of the present disclosure.

FIG. 13 is a diagram of a state in which a second cover is separated from an electronic device 1300, according to an embodiment of the present disclosure.

The electronic device 1300 may be any one of the electronic device 102 of FIG. 1, the electronic device 201 of FIG. 2, the electronic device 300 of FIG. 3A, the electronic device 400 of FIG. 4, the electronic device 500 of FIG. 5, and the electronic device 600 of FIG. 6.

The electronic device 1300 may include a first cover 1310-1 forming the first face 13001 that faces the first direction, and a second cover 1310-2 forming the second face 13002 that faces the second direction that is opposite to the first direction. The electronic device 1300 may include a bezel 1310-3 (e.g., the bezel 310-3 of FIG. 3A) forming a third face 13003 that surrounds the space between the first face 13001 and the second face 13002.

The electronic device 1200 may include a circuit board (e.g., the circuit board 1140 of FIG. 11) and a battery (e.g., the battery 1150 of FIG. 11.

When viewed from above the second face 13002, the electronic device 1300 may include a first conductive pattern 1370 and a second conductive pattern 1380.

The first conductive pattern 1370 may be a pattern that generally includes an additional turn 1370-T in the conductive pattern 770 of FIG. 7. For example, the additional turn 1370-T is a line extending from the second end 13702 to the third end 13703, and may be the outermost turn. The third end 13703 may be disposed adjacent to the second end 13702 in the outside of the second end 13702. Alternatively, the second end 13702 may be disposed between the first end 13701 and the third end 13702. The first conductive pattern 1370 may include a first contact 1370a formed on the first end 13701, a second contact 1370b formed on the second end 13702, and a third contact 1370c formed on the third end 13703.

The second conductive pattern 1380 may be similar or identical to the conductive pattern 970 of FIG. 9, and a detailed description thereof will be omitted.

When viewed from above the second face 13002, the first conductive pattern 1370 may be surrounded by the second conductive pattern 1380.

When viewed from above the second face 13002, the first winding portion 1370-1 of the first conductive pattern 1370 may include a plurality of lines arranged spirally from the center 1370-C as the starting point. When viewed from above the second face 13002, the center 1370-C may substantially coincide with the center 1300-C of the electronic device 1300 (e.g., the center 1100-c of FIG. 11). The lines of the first winding portion 1370-1 of the first conductive pattern 1370 may be arranged spirally from the center 1300-C of the electronic device 1300 as the starting point.

When viewed from above the second surface 13002, the first winding portion 1380-1 of the second conductive pattern 1380 (e.g., the first winding portion 980-1 of FIG. 9) may include a plurality of lines arranged spirally from the center 1370-C as the starting point.

The first conductive pattern 1370 and the second conductive pattern 1380 may be disposed together on a plane between the first face 13001 and the second face 13002 of the electronic device 1300. For example, the first conductive pattern 1370 and the second conductive pattern 1380 may be disposed on a plane that is disposed to be parallel to the first face 13001 or the second face 13002. Alternatively, the first conductive pattern 1370 and the second conductive pattern 1380 may be coupled to the second cover 1310-2, or may be included in the second cover 1310-2.

When viewed from the above of the second face 13002, the contacts (first contact 1370a, second contact 1370b, and the third contact 1370c) of the first conductive pattern 1370 may be disposed adjacent to the contacts (the first contact 1380a and the second contact 1380b) of the second conductive pattern 1380. For example, the contacts 1370a, 1370b, and 1370c of the first conductive pattern 1370 and the contacts 1380a and 1380b of the second conductive pattern 1380 may be disposed within a pre-designed region 13005 of the plane. The pre-designed region 13005 may correspond to a region where the contacts of a circuit board (e.g., the circuit board 640 of FIG. 6) are arranged.

When viewed from above the second face 13002, the contacts 1370a, 1370b, and 1270c of the first conductive pattern 1370 and the contacts 1380a and 1380b of the second conductive pattern 1380 may be disposed between the third face 13003 of the electronic device 1300 and the center 1300-C of the electronic device 1300. For example, the contacts 1370a, 1370b, and 1370c of the first conductive pattern 1370 and the contacts 1380a and 1380b of the second conductive pattern 1380 may be disposed closer to the $(3\text{-}1)^{th}$ face 13003-1 (e.g., the $(1\text{-}3)^{th}$ face 11003-1 of FIG. 11) than the center 1300-C of the electronic device 1300.

The contacts 1370a, 1370b, and 1370c of the first conductive pattern 1370 may be electrically connected to a circuit board (e.g., the circuit board 640 of FIG. 6). The contacts 1380a and 1380b of the second conductive pattern 1380 may be electrically connected to a circuit board.

The circuit board may include a circuit for various types of functions. For example, the circuit board may include a wireless charging circuit that supports various types of wireless charging using at least a portion of the first conductive pattern 1370 and/or the second conductive pattern 1380. Alternatively, the circuit board may include a communication circuit that supports various types of communication using at least a portion of the first conductive pattern 1370 and/or the second conductive pattern 1380.

Both the first conductive pattern 1370 and the second conductive pattern 1380 may be used as an antenna for wireless charging. For example, the first conductive pattern 1370 and the second conductive pattern 1380 may support different types of wireless charging, respectively. The first conductive pattern 1370 may be used as an antenna for wireless charging. Or, the second conductive pattern 1380 may be used as an antenna for resonant wireless charging. In another example, the first conductive pattern 1370 and the second conductive pattern 1380 may support the same types of wireless charging, respectively.

At least a portion of the first conductive pattern 1370 and the second conductive pattern 1380 may be used as an antenna for various types of communication. For example, at least a portion of the first conductive pattern 1370 and the second conductive pattern 1380 may support a short range communication (e.g., NFC or MST transmission/reception).

The first conductive pattern 1370 may be used as an antenna for wireless charging and the second conductive pattern 1380 may be used as an antenna for various types of communication. Alternatively, the first conductive pattern 1370 may be used as an antenna for various types of communication and the second conductive pattern 1380 may be used as an antenna for wireless charging.

A control circuit (e.g., the processor 210 of FIG. 2) of a circuit board (e.g., the circuit board 640 of FIG. 6) may selectively use (or activate) the first conductive pattern 1370 and/or the second conductive pattern 1380. For example, the control circuit may be adjusted to selectively connect the first conductive pattern 1370 to a wireless charging circuit or a communication circuit depending on various types of inputs (e.g., a user input, a sensor input, and a wireless input). Alternatively, the control circuit may be adjusted to selectively connect the second conductive pattern 1380 to a wireless charging circuit or a communication circuit depending on various types of inputs.

When it is sensed, through various inputs (e.g., sensor inputs, etc.), that the electronic device 1300 is mounted on the inductive external charging device, or the inductive wireless charging function is activated, the control circuit may electrically connect the first conductive pattern 1370 to the wireless charging circuit and may not electrically connect the second conductive pattern 1380 to the wireless charging circuit. Alternatively, when it is sensed, through various inputs, that the electronic device 1300 is mounted on the inductive external charging device, or the resonant wireless charging function is activated, the control circuit may electrically connect the second conductive pattern 1380 to the wireless charging circuit and may not electrically connect the first conductive pattern 1370 to the wireless charging circuit.

When the first communication is set as activated, the control circuit may electrically connect the first conductive pattern 1370 to the communication circuit and may not electrically connect the second conductive pattern 1380 to the communication circuit. Alternatively, when the second communication is set as activated, the control circuit may electrically connect the second conductive pattern 1380 to the communication circuit and may not electrically connect the first conductive pattern 1370 to the communication circuit.

The control circuit may electrically connect both the first conductive pattern 1370 and the second conductive pattern 1380 to the communication circuit so that the communication can be adjusted. For example, when the electronic device 1300 is affected by the user's body, or when deterioration of an antenna performance occurs, the control circuit may electrically connect the first conductive pattern 1370 or the second conductive pattern 1380 to the communication circuit so as to facilitate communication.

The control circuit may selectively adjust the first conductive pattern 1370 or the second conductive pattern 1380 to an electrical floating state. For example, when the electronic device 1300 is affected by the user's body, or when deterioration of the antenna performance (e.g., reduction of signal strength) occurs, the control circuit may adjust the first conductive pattern 1370 or the second conductive pattern 1380 to an electrical floating state so as to facilitate communication.

The control circuit may selectively adjust the electrical connection state of the contacts 1370a, 1370b, and 1370c of the first conductive pattern 1370 for various types of functions.

When it is sensed, through various inputs (e.g., a sensor input), that the electronic device 1300 is mounted on an external charging device, or the wireless charging function is activated, the control circuit may electrically connect the first contact 1370a and the second contact 1370b of the first conductive pattern 1370 to the wireless charging circuit, and may cause the third contact 1370c of the first conductive pattern 1370 to be in the electrical floating state.

When it is sensed, through the various inputs, that the communication (e.g., MST) function is set as activated, the control circuit may electrically connect the first contact 1370a and the third contact 1370c of the first conductive pattern 1370 to the communication circuit, and may adjust the second contact 1370b of the first conductive pattern 1370 to be in an electrical floating state.

Figure 14:
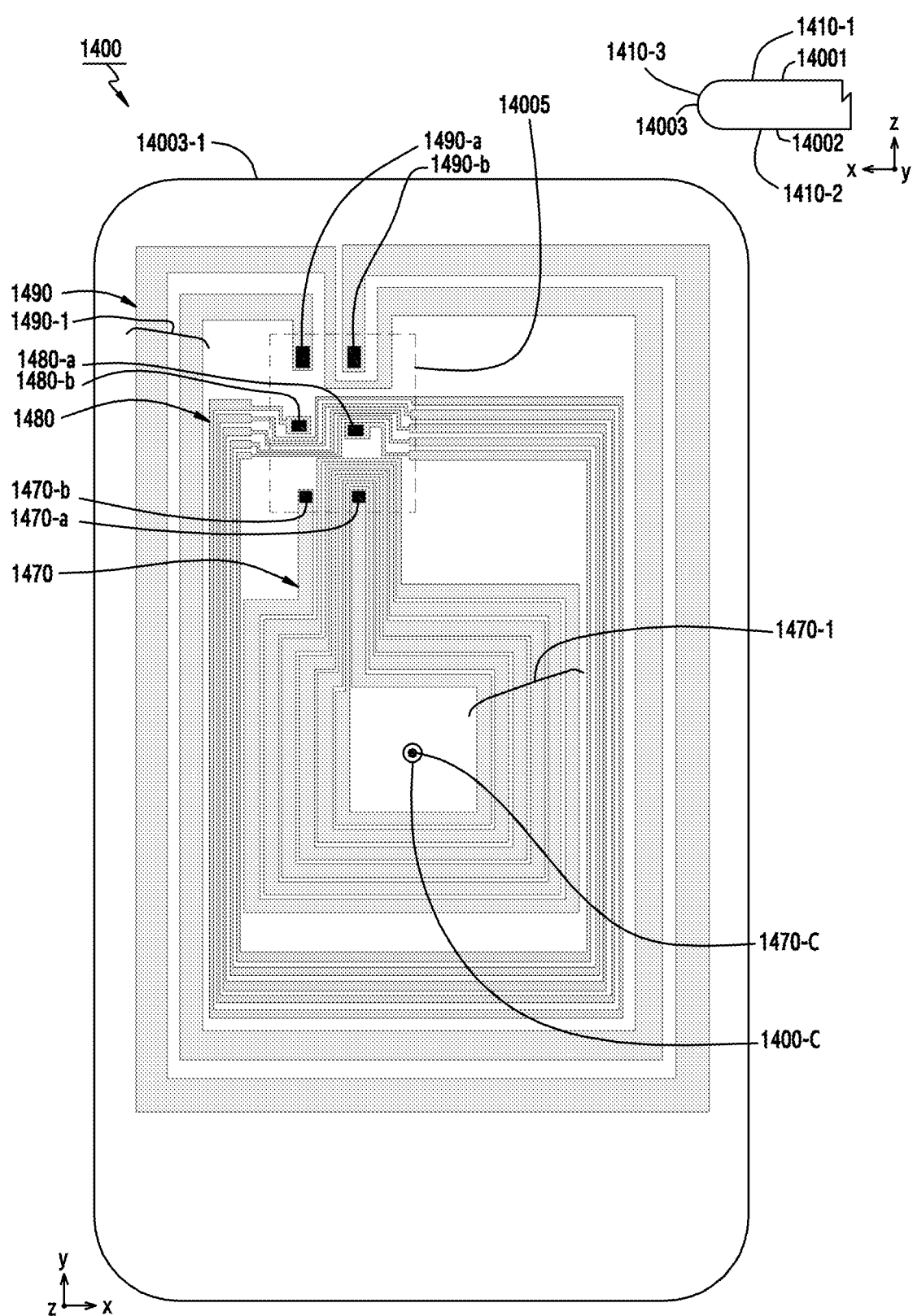
FIG. 14 is a diagram of a conductive pattern, according to an embodiment of the present disclosure.

FIG. 14 is a diagram of a state in which a second cover is separated from an electronic device 1400, according to an embodiment of the present disclosure.

The electronic device 1400 may be any one of the electronic device 102 of FIG. 1, the electronic device 201 of FIG. 2, the electronic device 300 of FIG. 3A, the electronic device 400 of FIG. 4, the electronic device 500 of FIG. 5, and the electronic device 600 of FIG. 6.

The electronic device 1400 may include a first cover 1410-1 forming the first face 14001 that faces the first direction, and a second cover 1410-2 forming the second face 14002 that faces the second direction that is opposite to the first direction. The electronic device 1400 may include a bezel 1410-3 (e.g., the bezel 310-3 of FIG. 3A) forming a third face 14003 that surrounds the space between the first face 14001 and the second face 14002.

The electronic device 1400 may include a circuit board (e.g., the circuit board 1140 of FIG. 11) and a battery (e.g., the battery 1150 of FIG. 11.

When viewed from above the second face 14002, the electronic device 1400 may include a first conductive pattern 1470, a second conductive pattern 1480, and a third conductive pattern 1490.

The first conductive pattern 1470 may be substantially similar or identical to the conductive pattern 770 of FIG. 7, and a detailed description thereof will be omitted. The third conductive pattern 1490 may be similar or identical to the conductive pattern 970 of FIG. 9, and a detailed description thereof will be omitted.

The second conductive pattern 1480 may be similar to the conductive pattern 1070 of FIG. 10. For example, the second conductive pattern 1480 is another example that includes a larger number of turns than the conductive pattern 1070 of FIG. 10.

When viewed from above the second face 14002, the first conductive pattern 1470 and the second conductive pattern 1480 may be surrounded by the third conductive pattern 1490. The second conductive pattern 1480 may be disposed between the first conductive pattern 1470 and the third conductive pattern 1490.

When viewed from above the second face 14002, the first winding portion 1470-1 of the first conductive pattern 1470 may include a plurality of lines arranged spirally from the center 1470-C as the starting point. When viewed from above the second face 14002, the center 1470-C may substantially coincide with the center 1400-C of the electronic device 1400 (e.g., the center 1100-c of FIG. 11). The lines of the first winding portion 1470-1 of the first conductive pattern 1470 may be arranged spirally from the center 1400-C of the electronic device 1400 as the starting point.

When viewed from above the second face 14002, the second conductive pattern 1480 may include a plurality of lines arranged spirally from the center 1470-C as the starting point.

When viewed from above the second surface 14002, the first winding portion 1490-1 of the third conductive pattern 1490 (e.g., the first winding portion 980-1 of FIG. 9) may include a plurality of lines arranged spirally from the center 1470-1 as the starting point.

The first conductive pattern 1470, the second conductive pattern 1480, and the third conductive pattern 1490 may be disposed together on a plane between the first face 14001 and the second face 14002 of the electronic device 1400. For example, the first conductive pattern 1470, the second conductive pattern 1480, or the third conductive pattern 1490 may be disposed on a plane that is disposed to be parallel to the second face 14002. Alternatively, the first conductive pattern 1470, the second conductive pattern 1480, or the third conductive pattern 1490 may be coupled to the second cover 1410-2, or may be included in the second cover 1410-2.

When viewed from above the second face 14002, the contacts (the first contact 1470-*a* and the second contact 1470-*b*) of the first conductive pattern 1470, the contacts (the first contact 1480-*a* and the second contact 1480-*b*) of the second conductive pattern 1480, and the contacts (the first contact 1490-*a* and the second contact 1490-*b*) of the third conductive pattern 1490 may be disposed to be adjacent to each other. For example, the contacts 1470-*a* and 1470-*b* of the first conductive pattern 1470, the contacts 1480-*a* and 1480-*b* of the second conductive pattern 1480, and the contacts 1490-*a* and 1490-*b* of the third conductive pattern 1490 may be disposed within a pre-designed region 14005 of the plane. The pre-designed region 14005 may correspond to a region where the contacts of a circuit board (e.g., the circuit board 640 of FIG. 6) are arranged.

When viewed from above the second face 14002, the contacts 1470-*a* and 1470-*b* of the first conductive pattern 1470, the contacts 1480-*a* and 1480-*b* of the second conductive pattern 1480, and the contacts 1490-*a* and 1490-*b* of the third conductive pattern 1490 may be disposed between the third face 14003 of the electronic device 1400 and the center 1400-C of the electronic device 1400. For example, the contacts 1470-*a* and 1470-*b* of the first conductive pattern 1470, the contacts 1480-*a* and 1480-*b* of the second conductive pattern 1480, and the contacts 1490-*a* and 1490-*b* of the third conductive pattern 1490 may be disposed closer to the (3-1)$^{th}$ face 14003-1 (e.g., the (1-3)$^{th}$ face 11003-1 of FIG. 11) than the center 1400-C of the electronic device 1400.

The contacts 1470-*a* and 1470-*b* of the first conductive pattern 1470, the contacts 1480-*a* and 1480-*b* of the second conductive pattern 1480, and the contacts 1490-*a* and 1490-*b* of the third conductive pattern 1490 may be electrically connected to a circuit board (not illustrated) (e.g., the circuit board 640 of FIG. 6).

The circuit board may include a circuit for various types of functions. For example, the circuit board may include a wireless charging circuit that supports various types of wireless charging using at least a portion of the first conductive pattern 1470, the second conductive pattern 1480, or the second conductive pattern 1490. Alternatively, the circuit board may include a communication circuit that supports various types of communication using at least a portion of the first conductive pattern 1470, the second conductive pattern 1480, or the third conductive pattern 1490.

At least one of the first conductive pattern 1470, the second conductive pattern 1480, and the third conductive pattern 1490 may be used as an antenna for inductive wireless charging. Alternatively, at least one of the first conductive pattern 1470, the second conductive pattern 1480, and the third conductive pattern 1490 may be used as an antenna for resonant wireless charging.

At least one of the first conductive pattern 1470, the second conductive pattern 1480, and the third conductive pattern 1490 may be used an antenna for cellular communication (e.g., LTE, LTE-A, CDMA, WCDMA, UMTS, WiBro, or GSM), and/or an antenna for short range communication (e.g., WiFi, Bluetooth, NFC, or GNSS).

A control circuit (e.g., the processor 210 of FIG. 2) of a circuit board (e.g., the circuit board 640 of FIG. 6) may selectively use (or activate) the first conductive pattern 1470, the second conductive pattern 1480, and/or the third conductive pattern 1490. For example, the control circuit may be adjusted to selectively connect at least one of the first conductive pattern 1470, the second conductive pattern 1480, and the third conductive pattern 1490 to a wireless charging circuit or a communication circuit depending on various types of inputs (e.g., a user input, a sensor input, and a wireless input).

The first conductive pattern 1470 may be used as an antenna for wireless charging, the second conductive pattern 1480 may be used as an antenna for MST transmission/reception, and the third conductive pattern 1490 may be used as a short range communication (e.g., NFC).

The control circuit may selectively adjust the first conductive pattern 1470, the second conductive pattern 1480, or the third conductive pattern 1490 to an electrical floating state. For example, when the electronic device 1400 is affected by the user's body, or when deterioration of the antenna performance (e.g., reduction of signal strength) occurs, the control circuit may adjust at least one of the first conductive pattern 1470, the second conductive pattern 1480, and the third conductive pattern 1490 to an electrical floating state so as to facilitate communication.

Figure 15:
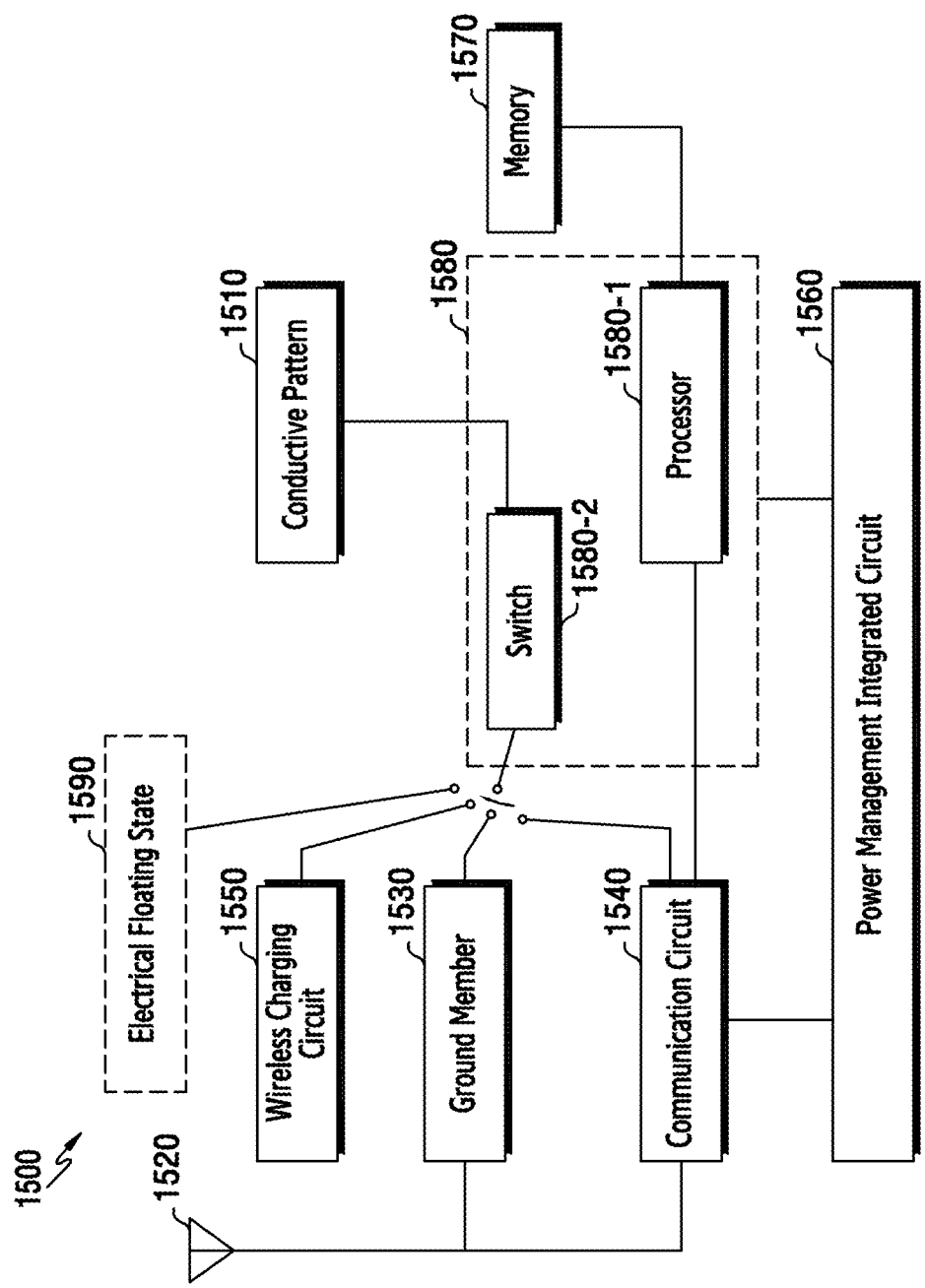
FIG. 15 is a diagram of an electronic device, according to an embodiment the present disclosure.

FIG. 15 is a diagram of a configuration of an electronic device 1500, according to an embodiment of the present disclosure.

The electronic device 1500 may be any one of the electronic device 102 of FIG. 1, the electronic device 201 of FIG. 2, the electronic device 300 of FIG. 3A, the electronic device 400 of FIG. 4, the electronic device 500 of FIG. 5, and the electronic device 600 of FIG. 6.

Referring to FIG. 15, the electronic device 1500 may include at least one conductive pattern 1510, at least one antenna radiator 1520, at least one ground member 1530, a communication circuit 1540, a wireless charging circuit 1550, a power management integrated circuit 1560, a memory 1570, and a control circuit 1580.

The at least one conductive pattern 1510 may be various types of metallic members that are provided in the electronic device 1500. For example, the at least one conductive pattern 1510 may be disposed inside the housing (e.g., the housing 310 of FIG. 3A) that forms the exterior of the electronic device 1500, or may form a portion of one face of the housing.

The housing may include a first face (the first face 3001 of FIG. 3A) that forms the front face of the electronic device 1500 and a second face (e.g., the second face 3002 of FIG. 3B) that forms the rear face of the electronic device 1500.

The at least one or more conductive pattern 1510 may be disposed on the second face, or may form a portion of the second face.

The at least one conductive member 1510 may be separated from a PCB on which the communication circuit 1540, the wireless charging circuit 1550, and the control circuit 1580 are mounted.

The at least one conductive pattern 1510 may take any of various forms, such as a metal plate or a coiled metal pattern. For example, the at least one conductive pattern 1510 may be the conductive pattern 570 of FIG. 5, the conductive pattern 670 of FIG. 6, the conductive pattern 770 of FIG. 7, the conductive pattern 870 of FIG. 8, the conductive pattern 970 of FIG. 9, the conductive pattern 1070 of FIG. 10, the conductive pattern 1170 of FIG. 11, the conductive patterns 1270 and 1280 of FIG. 12, the conductive patterns 1370 and 1380 of FIG. 13, or one of the conductive patterns 1470, 1480, and 1490.

The at least one conductive pattern 1510 may include a radiator (e.g., a wireless charging coil) for supporting the wireless charging circuit 1550. For example, the at least one conductive pattern 1510 may be used for transmitting wireless power to an external device, or for wirelessly receiving power from the external device.

The at least one conductive pattern 1510 may include an antenna radiator for supporting various types of communication of the communication circuit 1540.

The at least one conductive pattern 1510 may support short range communication. The short range communication may include WiFi, BT, NFC, and GNSS.

The at least one conductive pattern 1510 may include an antenna radiator for supporting transmission/reception of a magnetic signal.

The at least one conductive pattern 1510 may be electrically connected to the control circuit 1580. According to the operation of controlling the switch 1580-2 by the processor 1580-1, the at least one conductive pattern 1510 may be electrically connected to at least one of the ground member 1530, the communication circuit 1540, and the wireless charging circuit 1550, or may be in an electrical floating state 1590. The electrical floating state 1590 may refer to an electrically non-connected state with respect to any other electric component.

The at least one antenna radiator 1520 may support various types of communication. For example, the at least one antenna radiator 1520 may be used for cellular communication. The cellular communication may use at least one of LTE, LTE-A, CDMA, WCDMA, UMTS, WiBro, and GSM.

The at least one antenna radiator 1520 may be disposed at various positions of the electronic device 1500. For example, the one or more antenna radiators 1520 may be at least partially disposed in the inside of the housing that forms the exterior of the electronic device 1500 and/or on a portion of the housing.

The one or more conductive members 1520 may be mounted on the PCB on which the communication circuit 1540, the wireless charging circuit 1550, and the control circuit 1580 are mounted.

The one or more conductive members 1520 may be electrically connected to the communication circuit 1540. The one or more antenna radiators 1520 may be electrically connected to a ground of the PCB. The communication circuit 1540 may provide a current to the one or more antenna radiators 1520, and the current is circulated along the conductive pattern of the one or more antenna radiators 1520 to flow into the ground of the PCB, thereby forming a transmission line that is capable of transmitting/receiving wireless electromagnetic waves.

The one or more antenna radiators 1520 may be configured as at least one type that may be selected from a mono-pole antenna, a dipole antenna, an inverted-f antenna (IFA), a planar inverted-f antenna (PIFA), a loop antenna and a slot antenna.

At least one ground member 1530 may be disposed between the first face (e.g., the first face 3001 of FIG. 3A) and the second face (e.g., the second face 3002 in FIG. 3B) of the housing (e.g., the housing 310 of FIG. 3A).

The one or more ground members 1530 may be at least partially disposed in the inside of the housing that forms the exterior of the electronic device 1500 and/or on a portion of the housing.

The one or more antenna ground members 1530 may a portion of the PCB of the electronic device 1500. The one or more ground members 1530 may include a PCB ground.

The one or more ground members 1530 may be electrically connected to the one or more antenna radiators 1520. The one or more ground members 1530 may serve as an antenna ground for resonance of the one or more antenna radiators 1520.

The communication circuit 1540 may be electrically connected to the one or more antenna radiators 1520. For example, the communication circuit 1540 may be electrically connected to a processor 1580-1 of the control circuit 1580.

The communication circuitry 1540 may support various forms of communication (e.g., cellular communication) using at least one antenna radiator 1520 and/or at least one conductive pattern 1510. The communication circuit 1540 may transmit and receive a radio frequency signal through the at least one antenna radiator 1520 and/or the at least one conductive pattern 1510. The communication circuit 1540 may include all the RF components between the at least one antenna radiator 1520 and/or at least one conductive pattern 1510 and the control circuit 1580. For example, the communication circuit 1540 may include a radio frequency integrated circuit (RFIC) and a front end module (FEM). The RFIC (e.g., an RF transceiver) may receive radio waves from a base station, and may modulate a received high frequency waves into a low frequency band (base band) that is processable by the processor 1580-1).

In the reception of a wireless signal, the communication circuit 1540 may receive the wireless signal from the at least one antenna radiator 1520 and/or at least one conductive pattern 1510, may convert the received wireless signal into a baseband signal, and may transmit the converted baseband signal to the processor 1580-1. The processor 1580-1 may process the received baseband signal, and may control a human/mechanical interface of the electronic device 1500, which corresponds to the received baseband signal.

In the transmission of a wireless signal, the processor 1580-1 may generate a baseband signal and may transmit the baseband signal to the communication circuit 1540. The communication circuit 1540 may receive the baseband signal from the processor 1580-1, may convert the received baseband signal into a wireless signal, and may transmit the wireless signal through the air through the at least one antenna radiator 1520 and/or the at least one conductive pattern 1510.

The communication circuit 1540 may support at least one communication system among single input multiple output (SIMO), multiple input single output (MISO), diversity, and multiple input multiple output (MIMO) by using the one or more antenna radiators 1520.

When the at least one conductive pattern 1510 is used as at least one antenna radiator in order to support communication, the communication circuit 1540 may support various types of communication that use the at least one conductive pattern 1510. For example, the communication circuit 1540 may include a short range communication circuit, and may support short range communication (e.g., WiFi, BT, NFC, or GNSS) with an external device using the at least one antenna radiator 1510. For example, the communication circuit 1540 may include a communication circuit based on a magnetic signal, and may support transmission/reception of a magnetic signal (e.g., MST for electronic payment) with an external device using the at least one conductive pattern 1510.

When the at least one conductive pattern 1510 is used as a radiator for supporting wireless charging, the wireless charging circuit 1550 may be configured to wirelessly transmit power to an external device using the at least one conductive pattern 1510, or to wirelessly receive power from an external device. The wireless charging circuit 1550 may be configured as, for example, a magnetic resonance type, a magnetic induction type, or an electromagnetic wave type. The wireless charging circuit 1550 may include an additional circuit for wireless charging (e.g., a resonance circuit or a rectifier).

The PMIC 1570 may be electrically connected to the control circuit 1580 and the communication circuit 1540. The PMIC 1570 may efficiently manage and optimize the use of power within a system. For example, the processor 1580-1 may transmit, to the PMIC 1570, a signal according to load to be processed. The PMIC 1570 may adjust a core voltage to be supplied to the processor 1580-1 to be suitable to the processor 1580-1.

The PMIC 1560 may optimize a power distribution between a battery charging circuit and a system power supply device when the wireless charging circuit 1550 is electrically connected to the control circuit 1580.

The memory 1570 may be electrically connected to the processor 1580-1 of the control circuit 1580. The memory 1570 may store a software-related program (a set of commands) that can be executed by the processor 1580-1. The memory 1570 may include at least one high speed random accessory memory (e.g., a magnetic disc storage device) and/or a non-volatile memory or at least one optical storage device and/or a flash (e.g., NAND or NOR).

The memory 1570 may include a program for controlling the switch 1580-2 by the control circuit 1580 ("switch control program"). The term "program" may also be referred to as a group of commands or a command set. By the switch control program, the at least one conductive pattern 1510 may be electrically connected to the at least one ground member 1530 (e.g., the PCB ground) without being electrically connected to the communication circuit 1540 or the wireless communication circuit 1550. Alternatively, by the switch control program, the at least one conductive pattern 1510 may be electrically connected to the wireless charging circuit 1540 without being electrically connected to the at least one ground member 1530 or the wireless communication circuit 1540. Alternatively, by the switch control program, the at least one conductive pattern 1510 may be electrically connected to the wireless charging circuit 1550 without being electrically connected to the at least one ground member 1530 or the communication circuit 1540. Alternatively, by the switch control program, the at least one conductive pattern 1510 may be configured to be in an electrical floating state 1590 without being electrically connected to the at least one ground member 1530, the communication circuit 1540, or the wireless charging circuit 1550.

The switch control program may be configured to control the switch 1580-2 based on various inputs generated from the electronic device 1500. For example, the switch control program may be configured to control the switch 1580-2 based on at least a part of information acquired from one or more sensors of the electronic device 1500. For example, the switch control program may be configured to control the switch 1580-2 based on at least a part of a user input generated from various types of input devices that are mounted in the electronic device 1500.

The control circuit 1580 may include the processor 1580-1 and the switch 1580-2. The processor 1580-1 may execute various software programs (command sets) stored in the memory 1570 so as to perform various functions for the electronic device 1500. The processor 1580-1 may execute the switch control program stored in the memory 1570 so as to control the switch 1580-2 and to perform a function that is suitable thereto.

The electronic device may include: a housing that includes a first face that faces a first direction and a second face that faces a second direction, which is opposite to the first direction; at least one conductive pattern disposed in a plane that is disposed between the first face and the second face to be substantially parallel to the first face; and at least one electronic circuit electrically connected to the at least one conductive pattern. The conductive pattern may include a conductive line extending from a first end to a second end, and including a winding portion between the first end and the second end. The winding portion may include a plurality of turns including an innermost turn defining an inner periphery of the winding portion and an outermost turn defining an outer periphery of the winding portion. The electronic circuit may be electrically connected to a first point located on or near the first end of the conductive pattern, and to a second point located on or near the second end of the conductive pattern. When viewed from above the first face, both the first point and the second point may be disposed inside the inner periphery, outside the outer periphery, or between the inner periphery and the outer periphery.

The conductive pattern may be a single layer.

The conductive pattern may be a single conductive coil.

The first point and the second point may be disposed in the plane.

The electronic device may further include a battery between the first face and the second face. When viewed from above the first face, the winding portion may partially overlap with the battery, and the first point and the second point may not overlap with the battery.

The electronic device may further include a ferrite sheet disposed between the battery and the conductive pattern.

Both the first point and the second point may be disposed outside the outer periphery. When viewed from above the first face, the plurality of turns 780-T may include an annular portion and a protruding portion that protrudes to the outside of the annular portion. The first point may be disposed inside the protruding portion, and the second point may be disposed outside the protruding portion and near the protruding portion.

Both the first point and the second point may be disposed inside the inner periphery. When viewed from above the first face, the plurality of turns may include an annular portion and a protruding portion that protrudes to the inside of the annular portion. The first point may be disposed inside the protruding portion, and the second point may be disposed outside the protruding portion and near the protruding portion.

When viewed from above the first face, both the first point and the second point may be disposed inside the inner periphery, outside the outer periphery, or between the inner periphery and the outer periphery. The conductive line may include a portion extending outwardly from the inner edge and disposed between the first point and the second point.

The inner periphery and the outer periphery of the winding portion may have a rectangular or circular shape.

The at least one electronic circuit may receive and/or transmit a signal and/or power using the conductive pattern.

The at least one electronic circuit may generate an RF signal or a magnetic signal using the conductive pattern.

The RF signal may be a signal associated with a Near Field Communication (NFC) protocol.

The electronic device may further include a display disposed between the first face and the second face, and exposed through the first face. The conductive pattern may be coupled to the second face, or may form at least a portion of the second face.

The at least one conductive pattern may include a first conductive pattern and a second conductive pattern surrounding the first conductive pattern.

The first conductive pattern may be used for inductive wireless charging and the second conductive pattern may be used for resonant wireless charging.

Both the electrical connection portion of the first conductive pattern and the electronic circuit and the electrical connection portion of the second conductive pattern and the electronic circuit may be disposed in a predefined region of the plane to be close to each other.

The at least one conductive pattern may further include a third conductive pattern disposed between the first conductive pattern and the second conductive pattern.

The first conductive pattern may be used for wireless charging, the second conductive pattern may be used for Near Field Communication (NFC), and the third conductive pattern may be used for magnetic signal transmission/reception.

At least a portion on the outermost turn in the conductive pattern may be further electrically connected to the electronic circuit.

Each of the elements described herein may be configured with one or more components, and the names of the corresponding elements may vary based on the type of an electronic device. The electronic devices described herein may include at least one of the elements described herein, and some elements may be omitted or other additional elements may be further included in the electronic devices described herein.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:
1. An electronic device comprising:
a housing including a first face and a second face which face in opposite directions;
a conductive pattern disposed in a plane that is disposed between the first face and the second face, the conductive pattern extending in substantially the same direction as the first face; and
an electronic circuit disposed above the conductive pattern and electrically connected to the conductive pattern,
wherein the conductive pattern includes a conductive line extending from a first end to a second end and includes a winding portion between the first end and the second end,
wherein the winding portion includes a plurality of turns including an innermost turn defining an inner periphery of the winding portion and an outermost turn defining an outer periphery of the winding portion,
wherein the plurality of turns includes an annular portion and a protruding portion that protrudes an outside of the annular portion,
wherein the electronic circuit is electrically connected to a first point positioned to be one of on and near the first end of the conductive pattern, and to a second point positioned to be one of on and near the second end of the conductive pattern, and
wherein the first point and the second point are disposed outside the outer periphery, the first point is disposed inside the protruding portion, and the second point is disposed outside of and near the protruding portion.

2. The electronic device of claim 1, wherein the conductive pattern is a single layer.

3. The electronic device of claim 1, wherein the conductive pattern is a single conductive coil.

4. The electronic device of claim 1, wherein the first point and the second point are disposed in the plane between the first face and the second face.

5. The electronic device of claim 1, further comprising a battery disposed between the first face and the second face,
wherein the winding portion partially overlaps with the battery, and the first point and the second point do not overlap with the battery.

6. The electronic device of claim 5, further comprising a ferrite sheet disposed between the battery and the conductive pattern.

7. The electronic device of claim 1, wherein the first point and the second point are disposed inside the inner periphery,
wherein the plurality of turns include an annular portion and a protruding portion that protrudes the inside of the annular portion, and
wherein the first point is disposed inside the protruding portion, and the second point is disposed outside the protruding portion and near the protruding portion.

8. The electronic device of claim 1, wherein the first point and the second point are disposed between the inner periphery and the outer periphery, and
the conductive line includes a portion extending outwardly from the inner edge and disposed between the first point and the second point.

9. The electronic device of claim 1, wherein the inner periphery and the outer periphery of the winding portion have a rectangular shape.

10. The electronic device of claim 1, wherein the electronic circuit receives power using the conductive pattern.

11. The electronic device of claim 10, wherein the electronic circuit generates one of an RF signal and a magnetic signal using the conductive pattern.

12. The electronic device of claim 11, wherein the RF signal is a signal associated with a near field communication (NFC) protocol.

13. The electronic device of claim 1, further comprising a display disposed between the first face and the second face and exposed through the first face,
    wherein the conductive pattern is one of coupled to the second face and forms at least a portion of the second face.

14. The electronic device of claim 1, wherein the conductive pattern includes a first conductive pattern and a second conductive pattern surrounding the first conductive pattern.

15. The electronic device of claim 14, wherein the first conductive pattern is used for inductive wireless charging and the second conductive pattern is used for resonant wireless charging.

16. The electronic device of claim 14, wherein an electrical connection portion of the first conductive pattern and the electronic circuit and an electrical connection portion of the second conductive pattern and the electronic circuit are disposed in a predefined region of the plane between the first face and the second face.

17. The electronic device of claim 14, wherein the conductive pattern further includes a third conductive pattern disposed between the first conductive pattern and the second conductive pattern.

18. The electronic device of claim 17, wherein the first conductive pattern is used for wireless charging, the second conductive pattern is used for NFC, and the third conductive pattern is used for magnetic signal transmission/reception.

19. The electronic device of claim 1, wherein a portion on the outermost turn in the conductive pattern is electrically connected to the electronic circuit.

\* \* \* \* \*